US012710772B2

(12) United States Patent
Yalamanchi et al.

(10) Patent No.: US 12,710,772 B2
(45) Date of Patent: Aug. 18, 2026

(54) EFFICIENT ALLOCATION OF RESOURCES IN A FLEET MANAGEMENT SYSTEM

(71) Applicant: WING AVIATION LLC, Mountain View, CA (US)

(72) Inventors: Sai Bhargav Yalamanchi, Mountain View, CA (US); Aditya Undurti, Dublin, CA (US); Reia Cho, San Francisco, CA (US); Ke Xu, Newark, CA (US); Stephen Lacy, Mountain View, CA (US); Sean Blaes, San Mateo, CA (US); Jonathan Lesser, Oakland, CA (US); Brandon Jones, Redwood City, CA (US); Helen Chou, Sunnyvale, CA (US); Wouter Van Gijseghem, Stanford, CA (US)

(73) Assignee: Wing Aviation LLC, Palo Alto, CA (US)

( * ) Notice: Subject to any disclaimer, the term of this patent is extended or adjusted under 35 U.S.C. 154(b) by 50 days.

(21) Appl. No.: 18/666,348

(22) Filed: May 16, 2024

(65) Prior Publication Data

US 2025/0355449 A1 Nov. 20, 2025

(51) Int. Cl.

*G05D 1/698* (2024.01)
*G05D 1/644* (2024.01)

(Continued)

(52) U.S. Cl.

CPC ........... *G05D 1/6987* (2024.01); *G05D 1/644* (2024.01); *G06Q 10/083* (2013.01); *B64U 10/20* (2023.01);

(Continued)

(58) Field of Classification Search

CPC ................. G05D 1/6987; G05D 1/644; G05D 2105/285; G05D 2109/254; G06Q 10/083;

(Continued)

(56) References Cited

U.S. PATENT DOCUMENTS 10,671,064 B2 6/2020 Schmalzried et al.
11,578,481 B1 * 2/2023 Kohut ..................... F41H 11/02

(Continued)

OTHER PUBLICATIONS

Razzaq et al., Efficient Optimization Techniques for Resource Allocation in UAVs Mission Framework, Apr. 6, 2023, PLOS ONE, pp. 1-19 (Year: 2023).*

(Continued)

*Primary Examiner* — Sze-Hon Kong

(74) *Attorney, Agent, or Firm* — Christensen O'Connor Johnson Kindness PLLC

(57) ABSTRACT

In some embodiments, a computer-implemented method for managing resources of a fleet of unmanned aerial vehicles (UAVs) is provided. A computing system creates a mission record and one or more candidate records. Each candidate record of the one or more candidate records represents one or more resources for accomplishing a mission represented by the mission record. The computing system adds a mission node representing the mission record to a resource competition network graph (RCN graph). The computing system adds one or more candidate nodes representing the one or more candidate records to the RCN graph. The computing system determines an optimized allocation of candidate records to mission records using at least a subgraph of the RCN graph. A candidate record is determined to commit to a mission record, and the computing system updates the RCN graph to commit the candidate record to the mission record.

18 Claims, 26 Drawing Sheets

(51) Int. Cl.

| | |
|---|---|
| ***G06Q 10/083*** | (2023.01) |
| *B64U 10/20* | (2023.01) |
| *B64U 30/10* | (2023.01) |
| *B64U 30/295* | (2023.01) |
| *G05D 105/28* | (2024.01) |
| *G05D 109/25* | (2024.01) |

(52) U.S. Cl.
CPC ............ *B64U 30/10* (2023.01); *B64U 30/295* (2023.01); *B64U 2201/20* (2023.01); *G05D 2105/285* (2024.01); *G05D 2109/254* (2024.01)

(58) Field of Classification Search
CPC ...... B64U 10/20; B64U 30/10; B64U 30/295; B64U 2201/20
See application file for complete search history.

(56) References Cited

U.S. PATENT DOCUMENTS

| | | | |
|---|---|---|---|
| 12,293,670 | B2 * | 5/2025 | Venkatesh ................ G08G 5/22 |
| 2005/0090201 | A1 * | 4/2005 | Lengies ............. H04B 7/18506 455/431 |
| 2008/0270331 | A1 | 10/2008 | Taylor et al. |
| 2017/0337492 | A1 * | 11/2017 | Chen .................. G06Q 10/0633 |
| 2018/0341893 | A1 * | 11/2018 | nan't Westeinde .......................... G06Q 10/06312 |
| 2019/0122157 | A1 * | 4/2019 | Jenkins ................ G05D 1/0297 |
| 2019/0289469 | A1 | 9/2019 | Bentley et al. |
| 2021/0390479 | A1 * | 12/2021 | Itoh .................. G06Q 10/06313 |
| 2022/0351628 | A1 | 11/2022 | Ali et al. |
| 2022/0415187 | A1 * | 12/2022 | Borgyos ................... G08G 5/59 |
| 2022/0415188 | A1 * | 12/2022 | Zhang ...................... G08G 5/34 |
| 2024/0283627 | A1 * | 8/2024 | Zhang ................... H04L 5/1469 |
| 2024/0310860 | A1 * | 9/2024 | Van De Velde ....... G01C 21/20 |
| 2024/0411314 | A1 * | 12/2024 | Manouchehri ......... G05D 1/226 |
| 2024/0418522 | A1 * | 12/2024 | Garg .................. G01C 21/3438 |
| 2025/0159498 | A1 * | 5/2025 | Thorat ..................... G08G 5/55 |
| 2025/0264879 | A1 * | 8/2025 | Manouchehri ......... G05D 1/606 |
| 2025/0321786 | A1 * | 10/2025 | Ramalad ................. G06F 9/546 |

OTHER PUBLICATIONS

Shetty et al., Priority-based assignment and routing of a fleet of unmanned combat aerial vehicles, Nov. 1, 2006, Elsevier, ScienceDirect, Computers & Operations Research 35 (2008) pp. 1813-1828 (Year: 2006).*
Gosrich et al., Multi-Robot Coordination and Cooperation with Task Precedence Relationships, May 23, 2023, arXiv:2209.14417v2, pp. 1-7 (Year: 2023).*
Vachtsevanos et al., From mission planning to flight control of unmanned aerial vehicles: Strategies and implementation tools, Apr. 11, 2005, Elsevier, Annual Reviews in Control 29 (2005) pp. 101-115 (Year: 2005).*
Lee, Resource-based task allocation for multi-robot systems, Mar. 3, 2018, Elsevier, Robotics and Autonomous Systems 103 (2018), pp. 151-161 (Year: 2018).*
Butenko et al., Cooperative Control: Models, Applications and Algorithms, 2003, Springer-Science+Business Media, B.V. pp. 1-365 (Year: 2003).*
Procopiuc, O., "Geometry on the Sphere: Google's S2 Library", Slideshare, Nov. 24, 2022, 18 pages.
Gnegel, F. et al., "A 2D Layered Graph Approach for Scheduling Delivery Robots", Apr. 2021, 27 pages.
Choudhury, S., et al., "Efficient Large-Scale Multi-Drone Delivery using Transit Networks", Journal of Artificial Intelligence Research, Feb. 2021, pp. 757-788.
Wang, J., et al., "A Systematic Space-Time Route Planning Approach Coordinated With Task Assignment for Autonomous Delivery Vehicles Fleet", IEEE Access, Aug. 2, 2023, 14 pages.
Choudhury, S., et al., "Dynamic Multi-Robot Task Allocation under Uncertainty and Temporal Constraints", arXiv:2005.13109v3 [cs.RO], Jul. 25, 2020, 13 pages.
Luo, H., "Traffic Patrolling Routing Problem with Drones in an Urban Road System", Sensors, Nov. 25, 2019, 20 pages.
Poudel, S., et al., "Task assignment algorithms for unmanned aerial vehicle networks: A comprehensive survey", Vehicular Communications, Mar. 16, 2022, 29 pages.
Guijarro, L., et al., "Competition Between Service Providers With Strategic Resource Allocation: Application to Network Slicing", IEEE Access, Jun. 1, 2021, 15 pages.
Zou, Z., et al., "Study on Industrial Environmental Resources Competition Network Based on Bipartite Graph Theory", Advanced Materials Research, Aug. 2013, 5 pages.
Mishra M. et al., "Dynamic resource management and information integration for proactive decision support and planning", 2015 18th International Conference On Information Fusion (Fusion), ISIF, Jul. 6, 2015, pp. 295-302, XP033204709.
Yan F. et al., "Cooperative task allocation with simultaneous arrival and resource constraint for multi-UAV using a genetic algorithm", Expert Systems With Applications, Elsevier, vol. 245, Dec. 29, 2023, 13 pages, XP087487863, ISSN: 0957-4174, DOI: 10.1016/J.ESWA.2023.123023.
Wu W. et al., "Graph-based Modeling and Non-decoupling Solution for Distributed Cooperative Mission Planning", 2017 29th Chinese Control and Decision Conference (CCDC), IEEE, May 28, 2017, pp. 7263-7267, XP033120564.
Geng L. et al., "Cooperative Task Planning for Multiple Autonomous UAVs with Graph Representation and Genetic Algorithm", 2013 10th IEEE International Conference on Control and Automation (ICCA), IEEE, Jun. 12, 2013, pp. 394-399, XP032438757.
Ramirez-Atencia C. et al., "Solving complex multi-UAV mission planning problems using multi-objective genetic algorithms", Soft Computing, Springer, vol. 21, No. 17, Oct. 3, 2016, pp. 4883-4900, XP036303623.
Chen F. et al., "A System Architecture for Exploiting Mission Information Requirement and Resource Allocation", Ground/Air Multisensor Interoperability, Integration, and Networking for Persistent ISR III, 2012 SPIE vol. 8389 838908-9, May 2012, pp. 1-9, XP060003561.
Wang J J. et al., "Mission Planning for Heterogeneous Tasks with Heterogeneous UAVs", 2014 13th International Conference on Control Automation Robotics & Vision (ICARCV), IEEE, Dec. 2014, pp. 1484-1489, XP032749392, DOI: 10.1109/ICARCV.2014.7064535.
Ramirez-Atencia C. et al., "New Artificial Intelligence Approaches for Future UAV Ground Control Stations", 2017 IEEE Congress on Evolutionary Computation (CEC), IEEE, Jun. 5, 2017, pp. 2775-2782, XP033114688.
PCT International Search Report and Written Opinion mailed Jul. 18, 2025, in corresponding International application No. PCT/US2025/024943, 19 pages.

* cited by examiner

FIG. 1

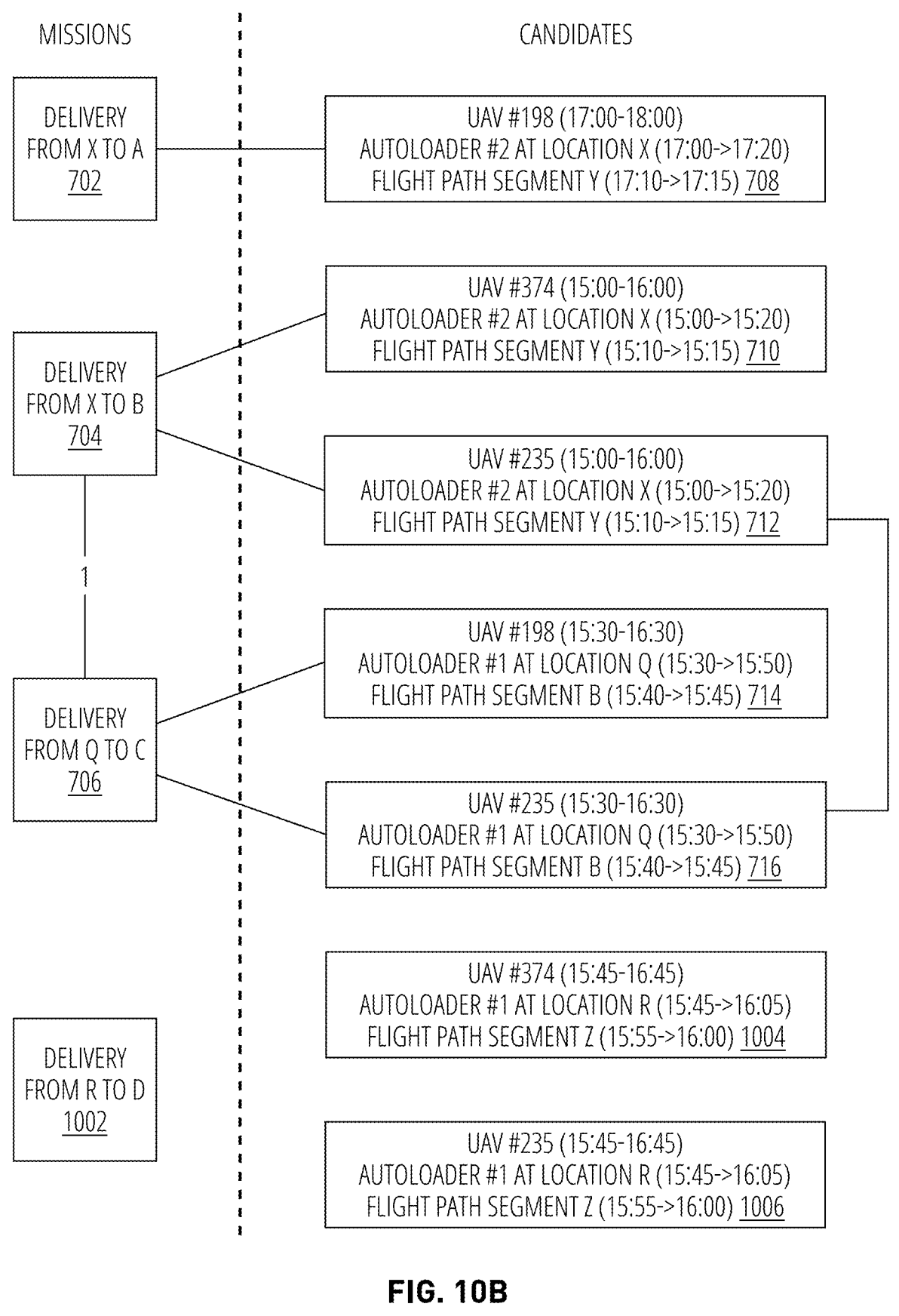

MISSIONS

CANDIDATES

DELIVERY FROM X TO A 702

DELIVERY FROM X TO B 704

1

DELIVERY FROM Q TO C 706

DELIVERY FROM R TO D 1002

UAV #198 (17:00-18:00) AUTOLOADER #2 AT LOCATION X (17:00->17:20) FLIGHT PATH SEGMENT Y (17:10->17:15) 708

UAV #374 (15:00-16:00) AUTOLOADER #2 AT LOCATION X (15:00->15:20) FLIGHT PATH SEGMENT Y (15:10->15:15) 710

UAV #235 (15:00-16:00) AUTOLOADER #2 AT LOCATION X (15:00->15:20) FLIGHT PATH SEGMENT Y (15:10->15:15) 712

UAV #198 (15:30-16:30) AUTOLOADER #1 AT LOCATION Q (15:30->15:50) FLIGHT PATH SEGMENT B (15:40->15:45) 714

UAV #235 (15:30-16:30) AUTOLOADER #1 AT LOCATION Q (15:30->15:50) FLIGHT PATH SEGMENT B (15:40->15:45) 716

UAV #374 (15:45-16:45) AUTOLOADER #1 AT LOCATION R (15:45->16:05) FLIGHT PATH SEGMENT Z (15:55->16:00) 1004

UAV #235 (15:45-16:45) AUTOLOADER #1 AT LOCATION R (15:45->16:05) FLIGHT PATH SEGMENT Z (15:55->16:00) 1006

FIG. 10B

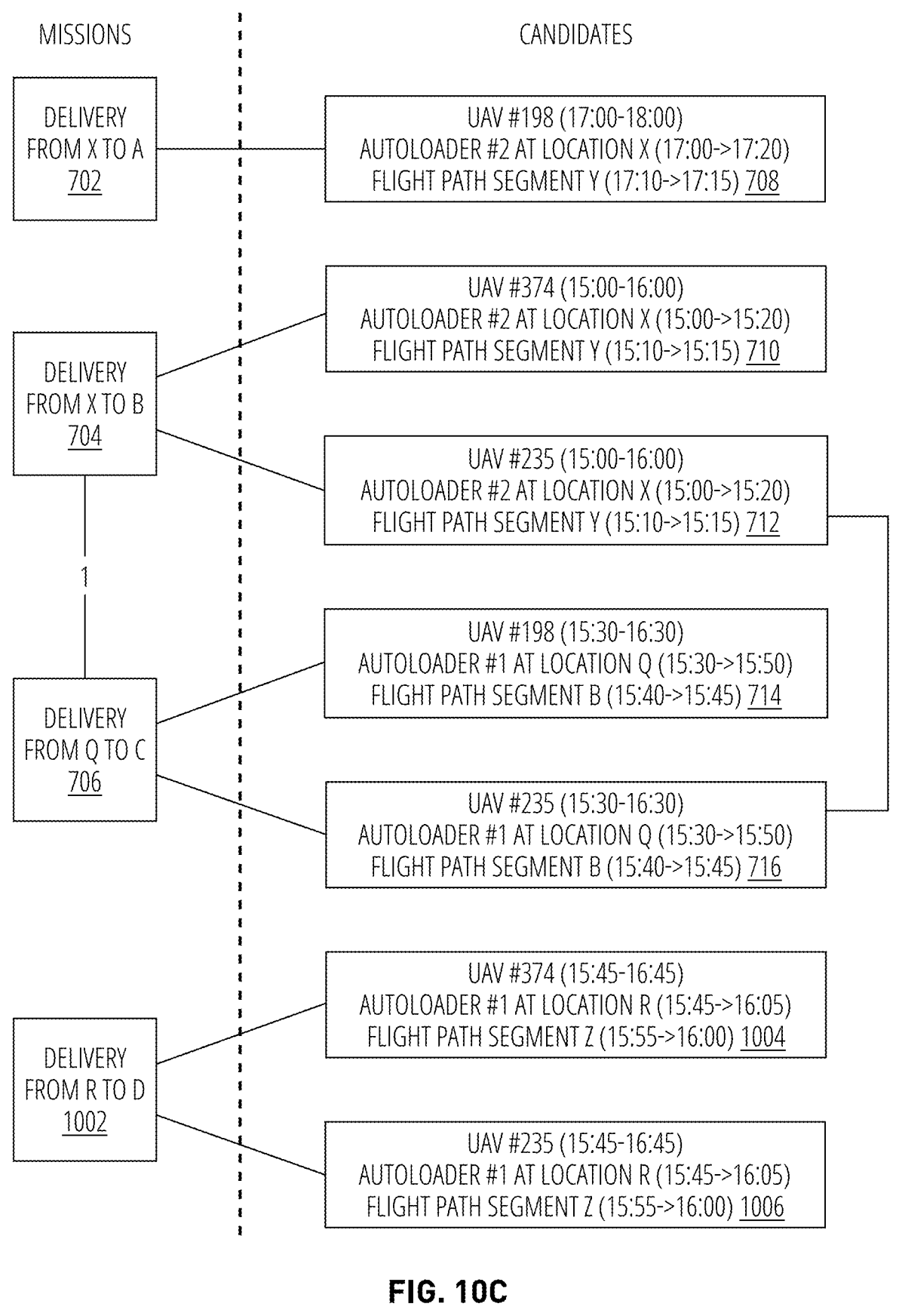

MISSIONS

CANDIDATES

DELIVERY FROM X TO A 702

UAV #198 (17:00-18:00)
AUTOLOADER #2 AT LOCATION X (17:00->17:20)
FLIGHT PATH SEGMENT Y (17:10->17:15) 708

DELIVERY FROM X TO B 704

UAV #374 (15:00-16:00)
AUTOLOADER #2 AT LOCATION X (15:00->15:20)
FLIGHT PATH SEGMENT Y (15:10->15:15) 710

UAV #235 (15:00-16:00)
AUTOLOADER #2 AT LOCATION X (15:00->15:20)
FLIGHT PATH SEGMENT Y (15:10->15:15) 712

1

DELIVERY FROM Q TO C 706

UAV #198 (15:30-16:30)
AUTOLOADER #1 AT LOCATION Q (15:30->15:50)
FLIGHT PATH SEGMENT B (15:40->15:45) 714

UAV #235 (15:30-16:30)
AUTOLOADER #1 AT LOCATION Q (15:30->15:50)
FLIGHT PATH SEGMENT B (15:40->15:45) 716

DELIVERY FROM R TO D 1002

UAV #374 (15:45-16:45)
AUTOLOADER #1 AT LOCATION R (15:45->16:05)
FLIGHT PATH SEGMENT Z (15:55->16:00) 1004

UAV #235 (15:45-16:45)
AUTOLOADER #1 AT LOCATION R (15:45->16:05)
FLIGHT PATH SEGMENT Z (15:55->16:00) 1006

FIG. 10C

EFFICIENT ALLOCATION OF RESOURCES IN A FLEET MANAGEMENT SYSTEM

TECHNICAL FIELD

This disclosure relates generally to resource management, and in particular but not exclusively, relates to managing resources in a fleet of autonomous vehicles.

BACKGROUND

The use of autonomous vehicles, including but not limited to unmanned aerial vehicles (UAVs), is increasing rapidly for a variety of purposes. For example, UAVs are being used to provide on-demand services for delivering packages to customers. Delivery service providers are now offering services to third parties, such as retailers, to fulfill deliveries of their packages to customers. In a non-limiting example, a customer may place an order with a retailer for a product. The delivery service provider then assigns a mission to a UAV that includes departing a "nest" or other ground service location of the delivery service provider for the UAV, navigating to a pickup location of the retailer, picking up a package containing the order, navigating to a dropoff location for the customer, dropping off the package, and navigating to a landing pad of the delivery service provider.

For one given delivery service provider, order of magnitude estimates for a number of UAVs, landing pads, and pickup locations may be $10^5$, $10^3$, and $10^3$, respectively, to achieve a target yearly capacity of 100 million delivery missions. An order of magnitude estimate for the mission intake rate is 10 missions/second globally during peak demand. Given these estimates, it is desirable that the allocation of resources to each mission is optimized with respect to one or more measures of utility, including but not limited to a delivery service throughput, a utilization factor, or expenditure in order to help achieve the target yearly capacity in an efficient manner. The utilization factor may be a ratio of the mission arrival rate to the mission service rate. A utilization factor less than 1 may make the system reach steady state with bounded service times for the missions. Meanwhile, a utilization factor greater than 1 results in unbounded service times and may lead to timeouts or otherwise unacceptably long service times. Additionally, it is desirable that the allocation of resources is performed in a manner that ensures mission service rates are not lower than the mission intake rates over sustained periods, otherwise, mission wait times may grow in an unbounded manner.

Large resource cardinalities make it prohibitively expensive to select an allocation that addresses these goals in an optimal manner by exhaustively enumerating all possible allocations and selecting the one that maximizes utility. What is desired are techniques that can accelerate the allocation of resources to missions in order to meet the desired performance goals.

BRIEF SUMMARY

In some embodiments, a non-transitory computer-readable medium having logic stored thereon is provided. The logic, in response to execution by one or more processors of a computing system, cause the computing system to perform actions for managing resources of a fleet of unmanned aerial vehicles (UAVs), the actions comprising: creating, by the computing system, a mission record and one or more candidate records, wherein each candidate record of the one or more candidate records represents one or more resources for accomplishing a mission represented by the mission record; adding, by the computing system, a mission node representing the mission record to a resource competition network graph (RCN graph); adding, by the computing system, one or more candidate nodes representing the one or more candidate records to the RCN graph; determining, by the computing system, an optimized allocation of candidate records to mission records using at least a subgraph of the RCN graph; determining a candidate record to commit to a mission record; and updating, by the computing system, the RCN graph to commit the candidate record to the mission record.

In some embodiments, a computer-implemented method for managing resources of a fleet of unmanned aerial vehicles (UAVs) is provided. A computing system creates a mission record and one or more candidate records. Each candidate record of the one or more candidate records represents one or more resources for accomplishing a mission represented by the mission record. The computing system adds a mission node representing the mission record to a resource competition network graph (RCN graph). The computing system adds one or more candidate nodes representing the one or more candidate records to the RCN graph. The computing system determines an optimized allocation of candidate records to mission records using at least a subgraph of the RCN graph. A candidate record is determined to commit to a mission record, and the computing system updates the RCN graph to commit the candidate record to the mission record.

BRIEF DESCRIPTION OF THE SEVERAL VIEWS OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described. To easily identify the discussion of any particular element or act, the most significant digit or digits in a reference number refer to the figure number in which that element is first introduced.

FIG. 1 is a schematic illustration of a system in which resources of a delivery service provider are managed according to various aspects of the present disclosure.

FIG. 10A-FIG. 10E are schematic illustrations of the addition of a mission node and candidate nodes to an RCN graph according to various aspects of the present disclosure.

DETAILED DESCRIPTION

Figure 2A:
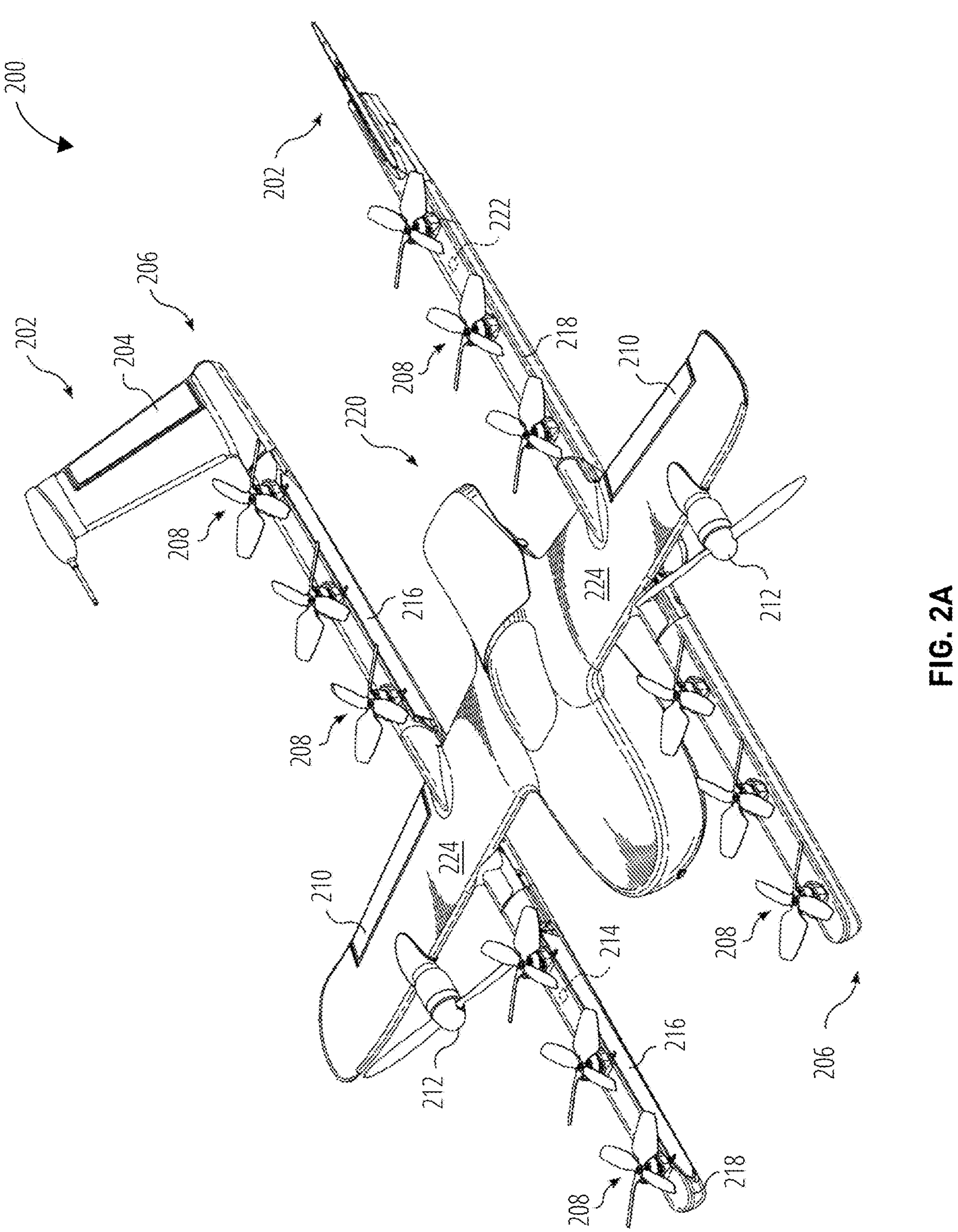
FIG. 2A and FIG. 2B illustrate an aerial vehicle or UAV, in accordance with various embodiments of the present disclosure.

In some embodiments of the present disclosure, resources associated with a fleet of UAVs are efficiently managed by a resource management computing system. The resource management computing system uses a resource competition network graph (RCN graph) in order to efficiently model conflicts between missions, and uses optimization techniques to optimally allocate resources to missions. By running the optimization techniques over mutated subgraphs instead of the entire RCN graph when missions are added or removed and by decoupling missions that do not compete with each other for resources, the efficiency of the allocation of resources remains high even when the number of resources being managed becomes large.

Figure 1:
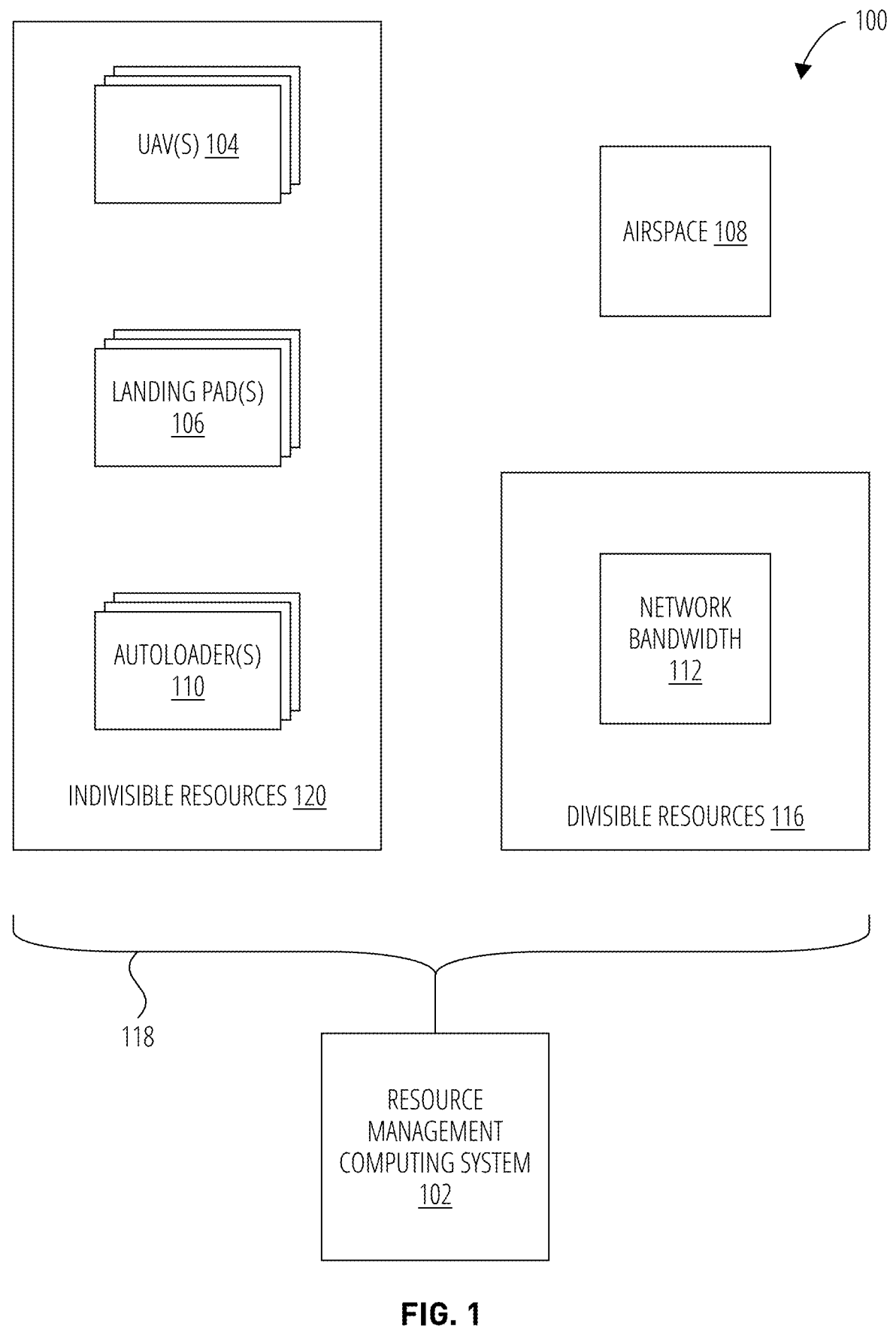

FIG. 1 is a schematic illustration of a system in which resources of a delivery service provider are managed according to various aspects of the present disclosure. As shown, the delivery service provider system 100 includes a resource management computing system 102 and a set of resources 118 usable to accomplish missions. The resource management computing system 102 determines candidate sets of resources 118 to accomplish each mission, and then determines an optimal allocation of the resources 118 to the missions. The resources 118 may include various different categories of resources, including one or more of indivisible resources 120, divisible resources 116, and/or airspace 108.

Indivisible resources 120 are resources that can be concurrently used by at most one mission at a time. Examples of indivisible resources 120 include, but are not limited to, UAVs 104, landing pads 106, and autoloaders 110. A landing pad 106 may be a charging pad, a staging area, a landing zone, or another location that denotes a start point or an end point of a mission for a UAV 104. The landing pad 106 is an indivisible resource 120 because only a single UAV 104 may be present on a given landing pad 106 at a time. An autoloader 110 is an apparatus present at a pickup location on which a package can be loaded and automatically picked up by a UAV 104 during a mission. The autoloader 110 is an indivisible resource 120 because, in relevant embodiments, only a single package may be attached to a given autoloader 110 so that a UAV 104 may autonomously pick up the correct package for a given mission.

Divisible resources 116 are resources that may be concurrently used by more than one mission at a time, but that may have a cap on a maximum amount of concurrent usage, or may have degraded service when used concurrently by more than one mission. One non-limiting example of a divisible resource 116 is network bandwidth 112. For example, a fleet management system may receive telemetry information from UAVs 104 while in flight, and the bandwidth of a wide area network used to transmit the telemetry information from a given geographic area may be limited. As another example, once a UAV 104 arrives at a landing pad 106 upon completing a mission, the UAV 104 may use network bandwidth 112 of the nest the landing pad 106 is located within in order to upload telemetry, logs, or other information from the mission. This log upload bandwidth may support concurrent uploads by more than one UAV 104 that has landed in close proximity in time to each other, but may only fully support a maximum number of concurrent uploads.

Airspace 108 is another type of resource 118 that may be managed by the resource management computing system 102. Airspace 108 is indivisible, in a way, in that the resource management computing system 102 may not assign a point in the airspace 108 to more than one mission at a given time. However, unlike other indivisible resource 120 which are discrete objects, in some embodiments, airspace 108 may be reserved using arbitrary volumes within an relevant geographic area. In some embodiments, airspace 108 may be reserved for a flight plan using one or more timed space reservations, which are a series of four-dimensional volumes that correspond to a flight plan. For example, a timed space reservation may reserve a given volume of airspace 108 from a start time until an end time for a given UAV 104 to traverse the volume. No two reserved volumes may overlap at any point at the same time, otherwise they will be in conflict. This allows the system to reduce or eliminate the risk of conflicts between UAVs 104 while in flight.

Figure 2B:
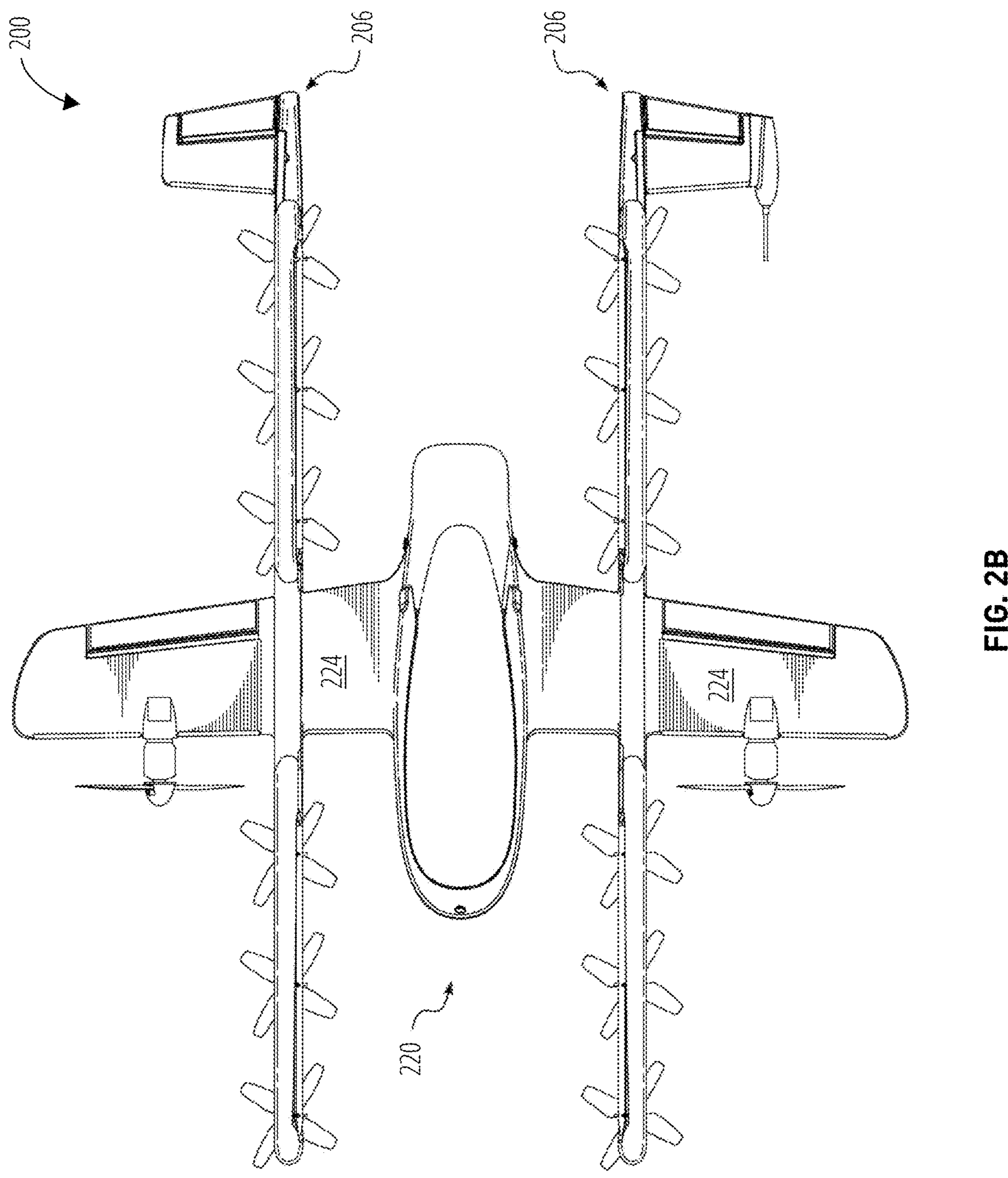

FIG. 2A and FIG. 2B illustrate an aerial vehicle or UAV 200, in accordance with an embodiment of the present disclosure. The UAV 200 is a non-limiting example of a type of apparatus usable as a UAV 104 in embodiments of the present disclosure, though in some embodiments, different or additional types of UAVs 104 may be used instead of or in addition to the illustrated UAV 200. The illustrated embodiment of UAV 200 is a vertical takeoff and landing (VTOL) unmanned aerial vehicle (UAV) that includes separate propulsion units 212 and propulsion units 208 for providing horizontal and vertical propulsion, respectively. UAV 200 is a fixed-wing aerial vehicle, which as the name implies, has a wing assembly 224 that can generate lift based on the wing shape and the vehicle's forward airspeed when propelled horizontally by propulsion units 212. FIG. 2A is a perspective top view illustration of UAV 200 while FIG. 2B is a bottom side plan view illustration of UAV 200.

The illustrated embodiment of UAV 200 includes a fuselage 220. In one embodiment, fuselage 220 is modular and includes a battery module, an avionics module, and a mission payload module. These modules are detachable from each other and mechanically securable to each other to contiguously form at least a portion of the fuselage 220 or UAV main body.

Figure 3:
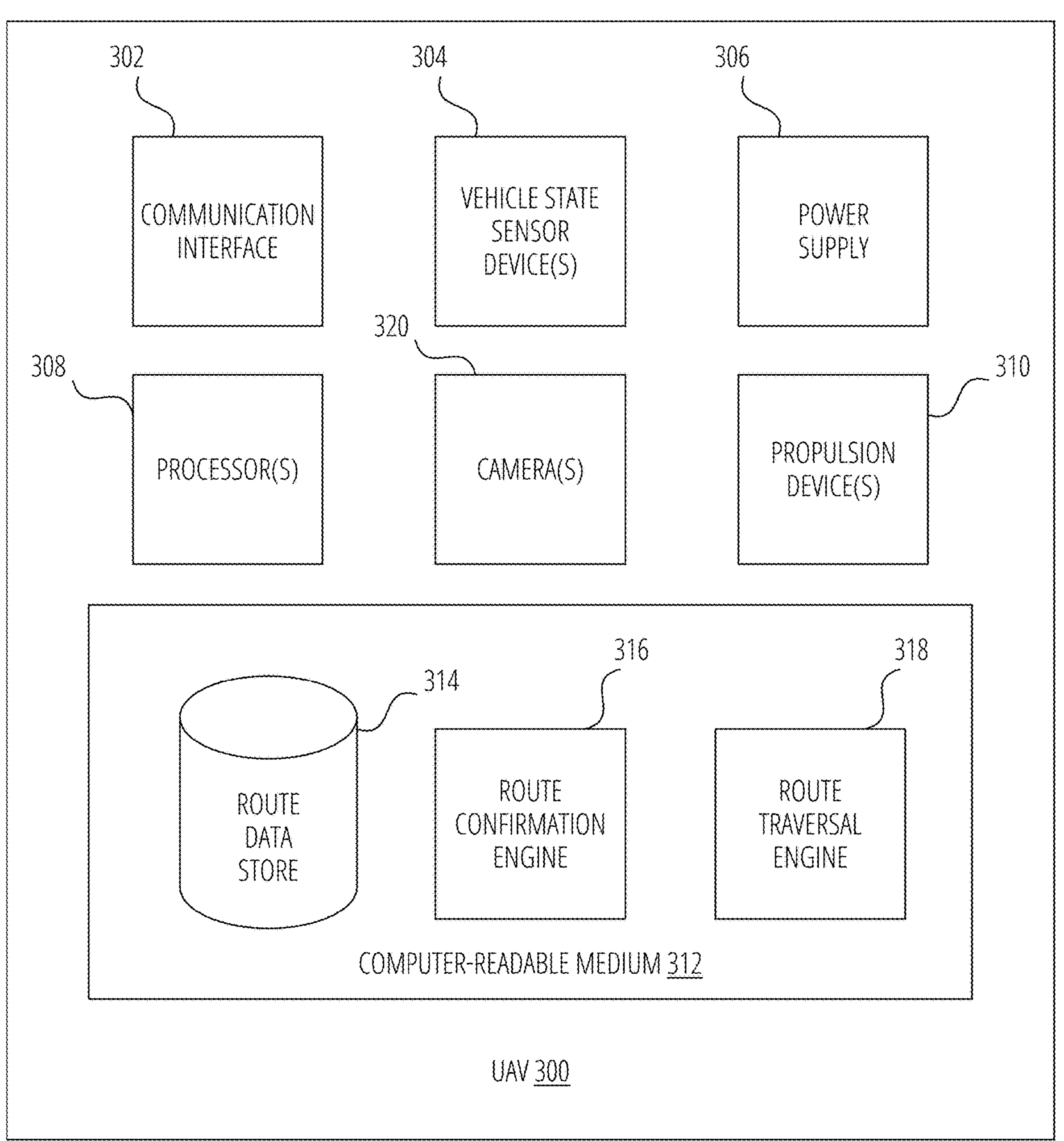
FIG. 3 is a block diagram that illustrates additional components of a non-limiting example embodiment of a UAV according to various aspects of the present disclosure.

The battery module includes a cavity for housing one or more batteries for powering UAV 200. The avionics module houses flight control circuitry of UAV 200, which may include a processor and memory, communication electronics and antennas (e.g., cellular transceiver, Wi-Fi transceiver, etc.), and various sensors (e.g., global positioning sensor, an inertial measurement unit (IMU), a magnetic compass, etc.). The mission payload module houses equipment associated with a mission of UAV 200. For example, the mission payload module may include a payload actuator for holding and releasing an externally attached payload. In another embodiment, the mission payload module may include a camera/sensor equipment holder for carrying camera/sensor equipment (e.g., camera, lenses, radar, LIDAR, pollution monitoring sensors, weather monitoring sensors, etc.). Other components that may be carried by some embodiments of the UAV 200 are illustrated in FIG. 3.

The illustrated embodiment of UAV 200 further includes horizontal propulsion units 212 positioned on wing assembly 224, which can each include a motor, shaft, motor mount, and propeller, for propelling UAV 200. The illustrated embodiment of UAV 200 includes two boom assemblies 206 that secure to wing assembly 224.

The illustrated embodiments of boom assemblies 206 each include a boom housing 218 in which a boom is disposed, vertical propulsion units 208, printed circuit boards 216, and stabilizers 202. Vertical propulsion units 208 can each include a motor, shaft, motor mounts, and propeller, for providing vertical propulsion. Vertical propulsion units 208 may be used during a hover mode where UAV 200 is descending (e.g., to a delivery location) or ascending (e.g., following a delivery). Stabilizers 202 (or fins) may be included with UAV 200 to stabilize the UAV's yaw (left or right turns) during flight. In some embodiments, UAV 200 may be configured to function as a glider. To do so, UAV 200 may power off its propulsion units and glide for a period of time.

During flight, UAV 200 may control the direction and/or speed of its movement by controlling its pitch, roll, yaw, and/or altitude. For example, the stabilizers 202 may include one or more rudders 204 for controlling the UAV's yaw, and wing assembly 224 may include elevators for controlling the UAV's pitch and/or ailerons 210 for controlling the UAV's roll. As another example, increasing or decreasing the speed of all the propellers simultaneously can result in UAV 200 increasing or decreasing its altitude, respectively. The UAV 200 may also include components for sensing the environment around the UAV 200, including but not limited to audio sensor 222 and audio sensor 214. Further examples of sensor devices are illustrated in FIG. 3 and described below.

Many variations on the illustrated fixed-wing aerial vehicle are possible. For instance, aerial vehicles with more wings (e.g., an "x-wing" configuration with four wings), are also possible. Although FIG. 2A and FIG. 2B illustrate one wing assembly 224, two boom assemblies 206, two horizontal propulsion units 212, and six vertical propulsion units 208 per boom assembly 206, it should be appreciated that other variants of UAV 200 may be implemented with more or fewer of these components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 3 is a block diagram that illustrates further components of a non-limiting example embodiment of a UAV according to various aspects of the present disclosure. In some embodiments, the UAV 300 is an aircraft such as the UAV 200 illustrated in FIG. 2A and FIG. 2B.

As shown, the UAV 300 includes a communication interface 302, one or more vehicle state sensor devices 304, a power supply 306, one or more processors 308, one or more propulsion devices 310, and a computer-readable medium 312.

In some embodiments, the communication interface 302 includes hardware and software to enable any suitable communication technology for communicating with a fleet management computing system and/or the resource management computing system 102. In some embodiments, the communication interface 302 includes multiple communication interfaces, each for use in appropriate circumstances. For example, the communication interface 302 may include a long-range wireless interface such as a 4G or LTE interface, or any other type of long-range wireless interface (e.g., 2G, 3G, 5G, or WiMAX), to be used to communicate with ground-based computing systems while traversing a route. The communication interface 302 may also include a medium-range wireless interface such as a Wi-Fi interface to be used when the UAV 300 is at an area near a start location or an endpoint where Wi-Fi coverage is available. The communication interface 302 may also include a short-range wireless interface such as a Bluetooth interface to be used when the UAV 300 is in a maintenance location or is otherwise stationary and waiting to be assigned a route. The communication interface 302 may also include a wired interface, such as an Ethernet interface or a USB interface, which may also be used when the UAV 300 is in a maintenance location or is otherwise stationary and waiting to be assigned a route.

In some embodiments, the vehicle state sensor devices 304 are configured to detect states of various components of the UAV 300, and to transmit signals representing those states to other components of the UAV 300. Some non-limiting examples of vehicle state sensor device 304 include a battery state sensor and a propulsion device health sensor. The vehicle state sensor devices 304 may also include a GNSS sensor, one or more accelerometers (and/or other devices that are part of an inertial navigation system), LIDAR devices, and/or other sensor devices for sensing an environment of the UAV 300.

In some embodiments, the power supply 306 may be any suitable device or system for storing and/or generating power. Some non-limiting examples of a power supply 306 include one or more batteries, one or more solar panels, a fuel tank, and combinations thereof. In some embodiments, the propulsion devices 310 may include any suitable devices for causing the UAV 300 to travel along the path. For an aircraft, the propulsion device 310 may include devices such as, but not limited to, one or more motors, one or more propellers, and one or more flight control surfaces.

In some embodiments, the processor 308 may include any type of computer processor capable of receiving signals from other components of the UAV 300 and executing instructions stored on the computer-readable medium 312.

In some embodiments, the computer-readable medium 312 may include one or more devices capable of storing information for access by the processor 308. In some embodiments, the computer-readable medium 312 may include one or more of a hard drive, a flash drive, an EEPROM, and combinations thereof.

In some embodiments, the one or more cameras 320 may include any suitable type of camera for capturing imagery from the point of view of the UAV 300. For example, the cameras 320 may include one or more of a downward-facing camera or an angled-view camera. In some embodiments, the one or more cameras 320 may include one or more cameras of any type, including but not limited to a visible light camera, an infrared camera, a light-field camera, a laser camera, and a time-of-flight camera.

As shown, the computer-readable medium 312 has stored thereon a route data store 314, a route confirmation engine 316, and a route traversal engine 318. In some embodiments, the route confirmation engine 316 is configured to transmit confirmations to the resource management computing system 102 that a route assigned to the UAV 300 has been received and the UAV 300 will commence autonomous traversal of the route. In some embodiments, the route traversal engine 318 is configured to cause the propulsion device 310 to propel the UAV 300 through the route received from the resource management computing system 102. The route traversal engine 318 may use signals from other devices, such as GPS sensor devices, vision-based navigation devices, accelerometers, LIDAR devices, and/or other devices that are not illustrated or described further herein, to assist in positioning and navigation as is typical for a UAV 300.

As used herein, "engine" refers to logic embodied in hardware or software instructions, which can be written in one or more programming languages, including but not limited to C, C++, C #, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. Yet another example of a data store is a Spanner database. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 4:
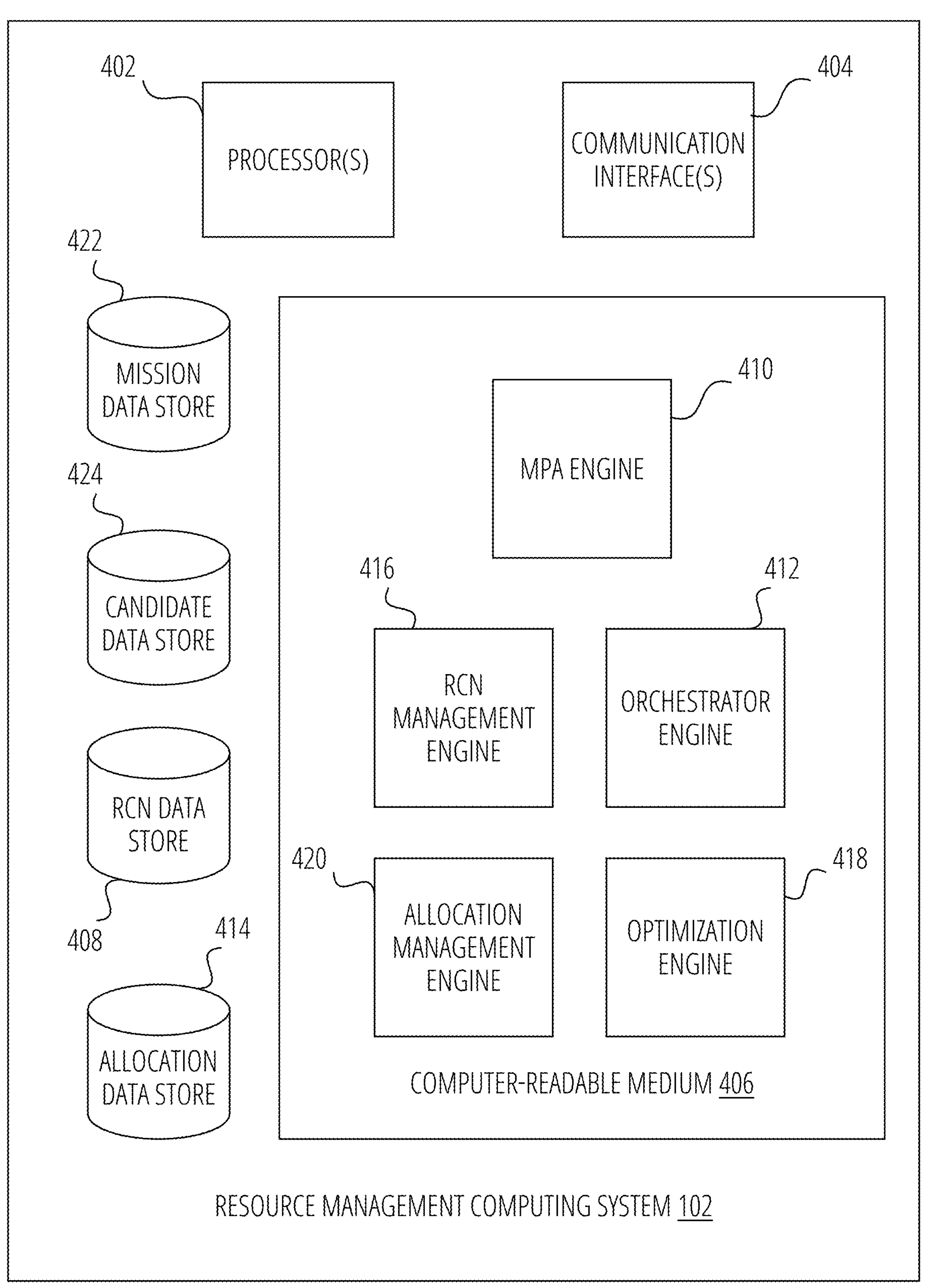
FIG. 4 is a block diagram that illustrates aspects of a non-limiting example embodiment of a resource management computing system according to various aspects of the present disclosure.

FIG. 4 is a block diagram that illustrates aspects of a non-limiting example embodiment of a resource management computing system according to various aspects of the present disclosure. The illustrated resource management computing system 102 may be implemented by any computing device or collection of computing devices, including but not limited to a desktop computing device, a laptop computing device, a mobile computing device, a server computing device, a computing device of a cloud computing system, and/or combinations thereof. The resource management computing system 102 is configured to manage resources 118 of a delivery service provider system 100 in an efficient manner that allows for scaling the delivery services to a large size without impacting performance.

As shown, the resource management computing system 102 includes one or more processors 402, one or more communication interfaces 404, a mission data store 422, a candidate data store 424, an RCN data store 408, an allocation data store 414, and a computer-readable medium 406.

In some embodiments, the processors 402 may include any suitable type of general-purpose computer processor. In some embodiments, the processors 402 may include one or more special-purpose computer processors or AI accelerators optimized for specific computing tasks, including but not limited to graphical processing units (GPUs), vision processing units (VPTs), and tensor processing units (TPUs).

In some embodiments, the communication interfaces 404 include one or more hardware and or software interfaces suitable for providing communication links between components. The communication interfaces 404 may support one or more wired communication technologies (including but not limited to Ethernet, FireWire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 406 has stored thereon logic that, in response to execution by the one or more processors 402, cause the resource management computing system 102 to provide a mission planning and assignment engine (MPA engine 410), an orchestrator engine 412, an RCN management engine 416, an optimization engine 418, and an allocation management engine 420.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the MPA engine 410 is configured to receive and/or generate missions. The MPA engine 410 may receive information for creating a new mission (e.g., a delivery location and an autoloader 110 or another location from which a package to be delivered may be retrieved by a UAV 104), and may create a new mission record representing the mission within the mission data store 422. Missions may be of different types, including but not limited to a delivery mission in which a package is delivered by a UAV 104 to a delivery location; a FitBIT or GeoBIT mission in which components of a UAV 104 and/or the system as a whole are tested; a ferry mission in which a UAV 104 is repositioned from one nest to another nest; or custom mission types. In some embodiments, a mission may be created at any time.

The MPA engine 410 may then generate one or more or more candidate records representing candidates for servicing the mission, and may store the candidate records in the candidate data store 424. A candidate specifies a set of resources 118 to successfully execute the mission. For example, a candidate may include an identifier of a particular UAV 104 capable of performing the mission, a landing pad 106 from which the UAV 104 will be staged, a landing pad 106 on which the UAV 104 will land at the end of the mission, an autoloader 110 from which the package will be picked up, a delivery location to which the package will be delivered, and one or more timed space reservations of airspace 108 for a flight path from the start landing pad 106, to the autoloader 110, then to the delivery location, and finally to the destination landing pad 106. The MPA engine 410 may generate multiple candidates for a given mission with different combinations of resources 118. In some embodiments, flight plans for candidates may be generated asynchronously by a planner service. Candidates created and stored in the candidate data store 424 may be removed if they expire, based on their creation timestamps. Candidates may also be removed from the candidate data store 424 once committed to an allocated mission, as described in further detail below. The creation of missions and/or candidates may occur at any time, and so it is desirable for the consistency of these data stores to be maintained such that the other components of the resource management computing system 102 may access them for planning purposes while accounting for the latest state of the system.

It is worth noting that the MPA engine 410 creates the missions and candidates without regard to whether there are conflicts between either newly generated missions/candidates or between the newly generated missions/candidates and existing missions/candidates. Such conflicts are dealt with by other components of the system as described in detail below.

In some embodiments, once an allocation of candidates to missions is stored by the orchestrator engine 412 in the allocation data store 414 (as discussed in detail below), the MPA engine 410 may retrieve allocations from the allocation data store 414 to determine the current allocated candidate for a given mission. The MPA engine 410 may then commit an allocated candidate to a mission and then to transmit commands to resources 118 of the candidate to cause the mission to be executed.

Further description of the configuration of each of these components is provided below.

Collectively, the components of the resource management computing system 102 provide a continuously running service that dynamically updates allocations for missions that are currently active within the MPA engine 410 (e.g., awaiting resources for execution) based on their currently active candidates. Since missions and candidates can be created and removed at any time, the set of active missions and candidates may change from time to time. Not all missions share common candidate resources, and so the resource allocation problem for such missions can be solved independently from each other. In order to efficiently capture the relationships between missions and candidates, missions and candidates may be represented in a Resource Competition network graph (RCN graph).

The RCN graph, at any point, provides connected components of mission nodes. Mission nodes are reachable from each other via edges in the RCN graph if they compete for resources. In some embodiments, the resource management computing system 102 tracks connected components having at least one mission node whose adjacency information changed due to one or more graph mutations through the addition or removal of missions and/or candidates. Since other components would not have their allocations changed while allocating resources for the mutated component, it is not necessary to track them.

In some embodiments, operations on the RCN graph and allocation solutions may be batched to avoid delays associated with lock contention in parallel computing implementations. Allocation problems for mutated subgraphs may be solved independently and in parallel to increase throughput. After allocations are determined, they may be written to the allocation data store 414, and fetched at any time by the MPA engine 410 for missions of interest.

Figure 5:
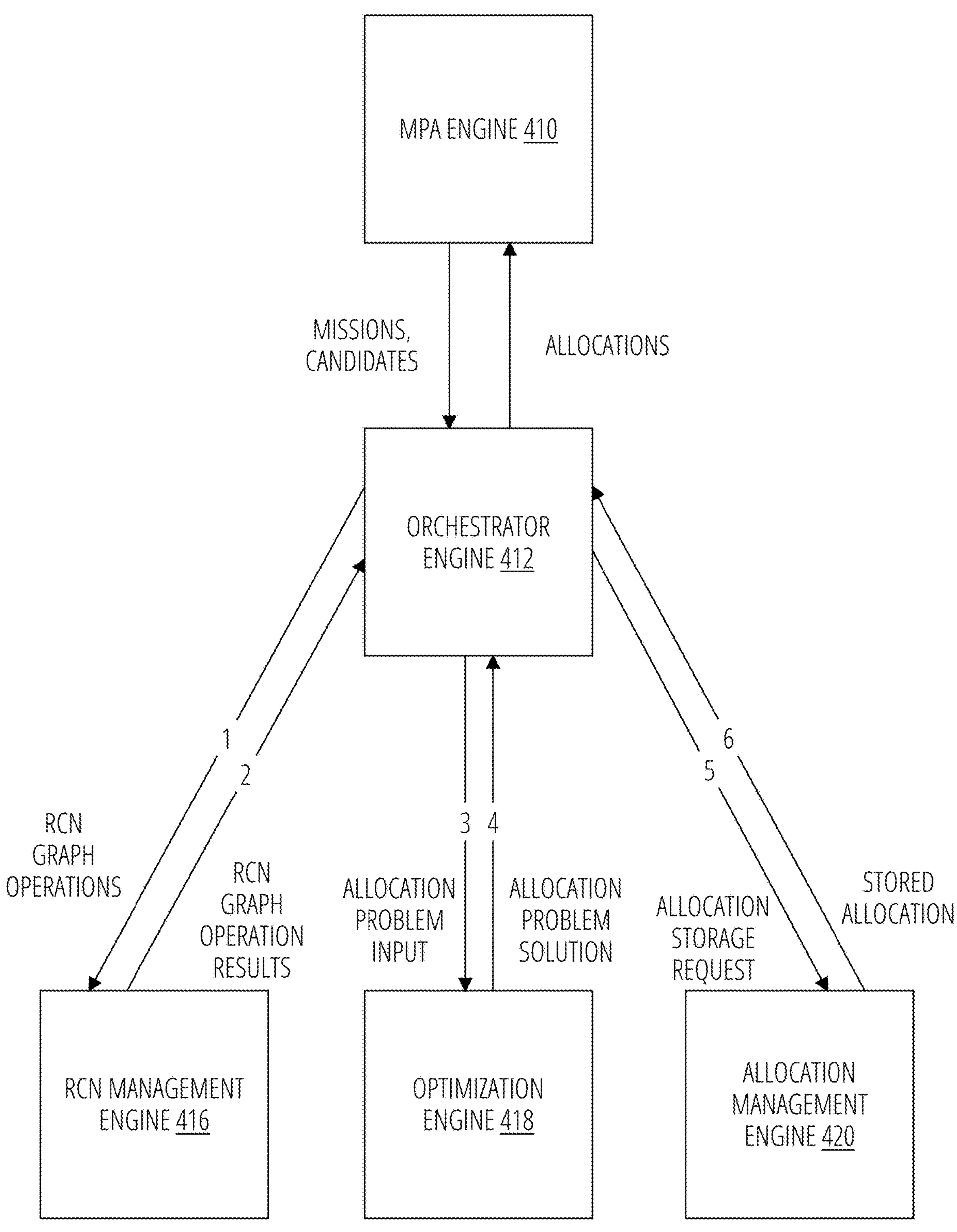
FIG. 5 is a schematic illustration of a workflow implemented by the resource management computing system according to various aspects of the present disclosure.

FIG. 5 is a schematic illustration of a workflow implemented by the resource management computing system according to various aspects of the present disclosure. Each of the elements of the resource management computing system 102 may asynchronously exchange information in one or more workflows as illustrated in FIG. 5 to allocate resources 118 for missions. The MPA engine 410 creates missions and candidates, which are stored by the MPA engine 410 in persistent storage (e.g., the mission data store 422 and candidate data store 424). The orchestrator engine 412 may then asynchronously retrieve missions and candidates from persistent storage and communicate with other nodes to asynchronously manage the allocation problem. Each of the numbered arrows in FIG. 5 illustrate an asynchronous exchange of information between the orchestrator engine 412 and a worker node, with the numbers indicating an order of operations.

In a first exchange, the orchestrator engine 412 provides RCN graph operations (e.g., adding a new mission and/or new candidates) to the RCN management engine 416 for addition to the RCN graph. In a second exchange, the RCN management engine 416 provides a result of the RCN graph operations back to the orchestrator engine 412. The result of the RCN graph operation may be a mutation list or other representation of the updated portions of the RCN graph.

In a third exchange, the orchestrator engine 412 provides an allocation problem input to the optimization engine 418. The allocation problem input may include the updated portions of the RCN graph, as well as one or more indications allowing the optimization engine 418 to determine relative measures of utility for various allocations of candidates to missions. Once the optimization engine 418 determines an allocation, the optimization engine 418 provides the allocation problem solution to the orchestrator engine 412 in a fourth exchange.

In some embodiments, the allocation problem solution may be created in high speed, volatile memory for the sake of efficiency. Accordingly, in a fifth exchange, the orchestrator engine 412 may provide an allocation storage request to the allocation management engine 420 to persist the allocation from volatile memory to non-volatile storage. In a sixth exchange, the allocation management engine 420 may provide a reference to the stored allocation back to the orchestrator engine 412. Once the allocation is stored in non-volatile storage, the allocation may be accessed by the MPA engine 410 to commit allocated resources 118 to missions and thereby cause the missions to take place.

Figure 6:
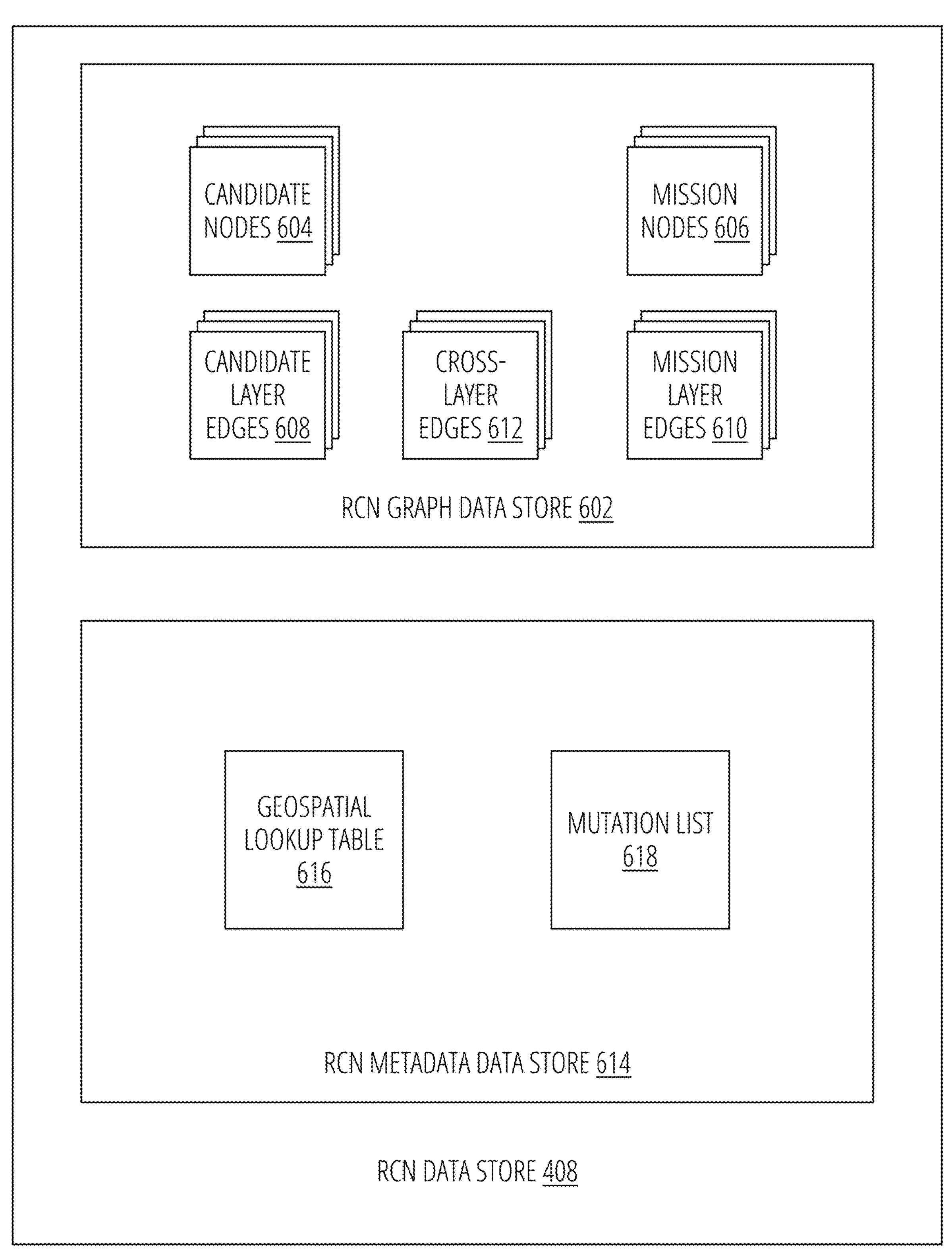
FIG. 6 is a block diagram that illustrates aspects of a non-limiting example embodiment of an RCN data store according to various aspects of the present disclosure.

FIG. 6 is a block diagram that illustrates aspects of a non-limiting example embodiment of an RCN data store according to various aspects of the present disclosure. As shown, the RCN data store 408 includes two sub-stores: an RCN graph data store 602 and an RCN metadata data store 614. In some embodiments, the RCN graph data store 602 and RCN metadata data store 614 may be provided by separate data stores. In some embodiments, at least some components of the RCN graph data store 602 and the RCN metadata data store 614 may be stored in the same data store, but are illustrated separately in FIG. 6 to clarify the types of data stored in each.

In some embodiments, the RCN graph data store 602 is configured to store information representing the contents of the RCN graph. As such, the RCN graph data store 602 stores a set of candidate nodes 604, a set of mission nodes 606, a set of candidate layer edges 608, a set of mission layer edges 610, and a set of cross-layer edges 612. In some embodiments, each type of data in the RCN graph data store 602 may be stored in one or more separate tables or other collections of data within the RCN graph data store 602. The cross-layer edges 612 connect candidate nodes 604 in the candidate layer to their corresponding mission nodes 606 in the mission layer. The candidate layer edges 608 connect conflicting candidate nodes 604 to each other. The mission layer edges 610 connect mission nodes 606 that have a candidate each that conflicts with one another. In some embodiments, the mission layer edges 610 may track a number of conflicts between the connected mission nodes, defined as the number of conflicting pairs of non-sibling candidates corresponding to these mission nodes.

In some embodiments, the RCN metadata data store 614 includes one or more data structures that improve the efficiency of using the information in the RCN graph data store 602. In some embodiments, the RCN metadata data store 614 includes a geospatial lookup table 616 and a mutation list 618. In some embodiments, the geospatial lookup table 616 provides an index that allows efficient queries for objects in the RCN graph data store 602 within a given geographical area. By organizing the geographical areas of the geospatial lookup table 616 to coincide with a maximum range of a UAV 104, all potential conflicting candidates for a given candidate may be retrieved by retrieving candidates within the same geographical area as the given candidate as well as the neighboring geographical areas.

For example, one non-limiting example of a technique for storing information in the geospatial lookup table 616 is to use S2Cells. S2 is an open source technique for representing geographical areas as a shapes on a sphere, referred to as "cells." The S2Cells are arranged in a hierarchy, such that a level 1 S2Cell uniquely covers an area that is approximately 85,000,000 square kilometers, a level 2 S2Cell uniquely covers an area that is approximately 21,000,000 square kilometers, and so on, until the smallest level 30 S2Cell that uniquely covers an area that is between 0.48 and 0.93 square centimeters. Each S2Cell on the surface of the sphere is uniquely identified by a 64-bit integer, which makes it particularly useful for an index into the geospatial lookup table 616.

In some embodiments, an entry is stored in the geospatial lookup table 616 for each candidate node 604, indexed by the identifier of the S2 cell associated with the takeoff location of the candidate node 604. By choosing an appropriate level S2 cell that is large enough to contain the maximum range of the UAVs 104, the geospatial lookup table 616 may then be used to retrieve all potentially conflicting candidate nodes 604 for a new candidate node 604 by retrieving entries indexed by the same S2Cell as the new candidate node 604 as well as entries indexed by the 8 horizontal, vertical, and diagonal neighbors of this S2Cell. In some embodiments, level 7 S2Cells may be used to index the candidate nodes 604 in the geospatial lookup table 616.

In some embodiments, the mutation list 618 is configured to store a representation of portions of the RCN graph that have changed since a previous allocation has been calculated. By nature of its design, allocations within connected portions of the RCN graph may affect each other, but allocations in unconnected portions of the RCN graph will not affect each other because there are no conflicts between them. Thus, by tracking portions of the RCN graph that have changed, allocations can be recalculated for just the changed portions of the RCN graph instead of the entire RCN graph, thus greatly increasing the ability to scale allocations to handle a large number of concurrent missions and candidates.

The mutation list 618 may store the representation of changed portions of the RCN graph in any suitable way. In some embodiments, the mutation list 618 stores a running list of mutated, connected mission node components. At any point, each component represents a connected component of mission nodes. Each component is fully identified (i.e., the component includes all reachable nodes from a given point in the RCN graph, and there are no other reachable nodes that are not included in the component). All nodes in the RCN graph with changed adjacency information are captured by the mutation list 618. This list may be cleared after the list elements are consumed by the allocation management engine 420 to determine a new allocation.

In some embodiments, instead of a running list of components, the mutation list 618 may store just representations of mission nodes 606 and/or candidate nodes 604 whose adjacency information has been mutated. In such embodiments, the connected components that can be reached from these nodes may be lazily determined. The connected components can be determined lazily at any time from the list of mutated nodes and a snapshot of the RCN graph at the time of the query. Similar to the running list embodiment, these embodiments may also clear the mutation list 618 once a new allocation is determine for the mutated subgraph by the allocation management engine 420.

Figure 7:
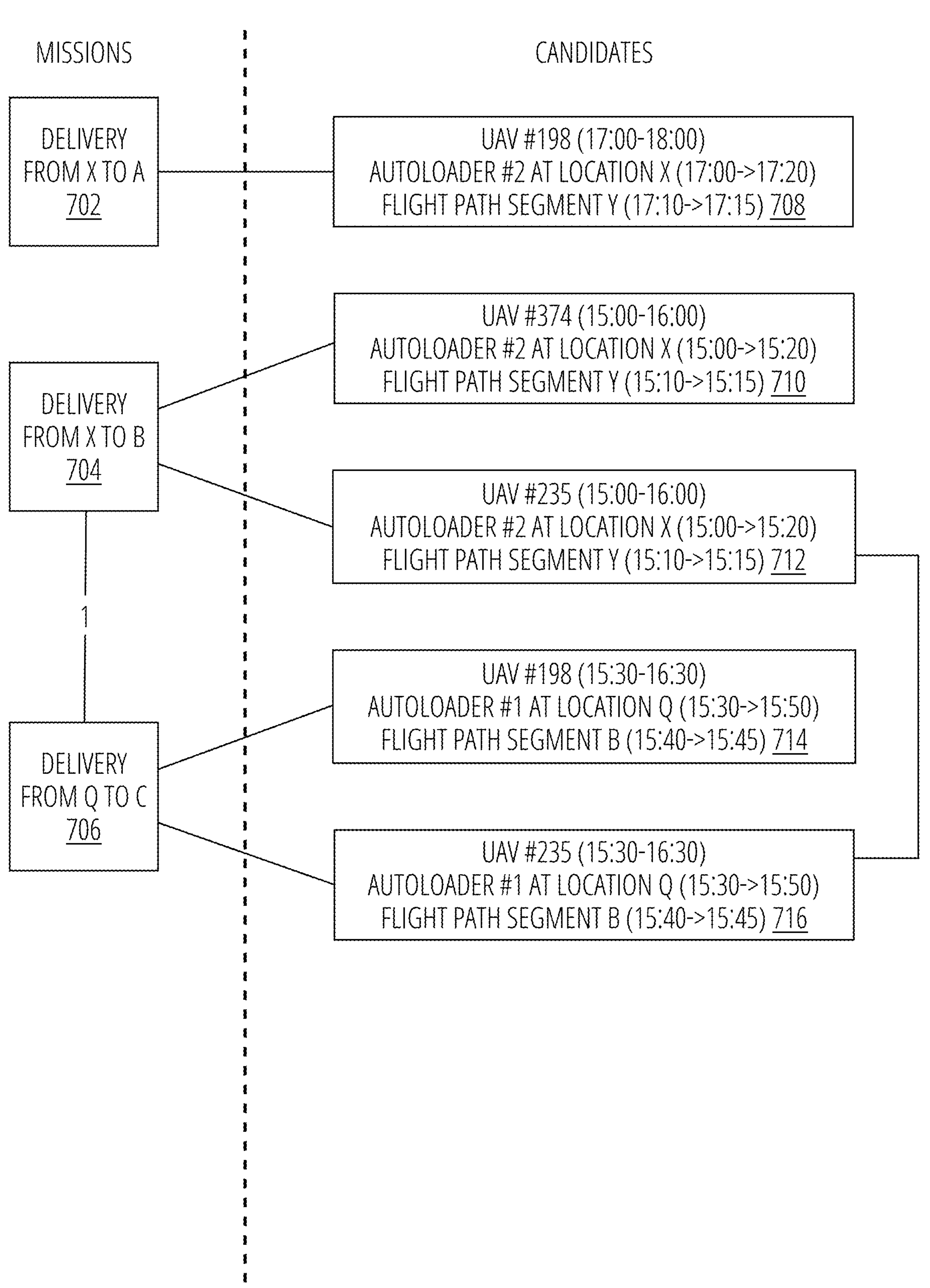
FIG. 7 is a schematic illustration of a non-limiting example embodiment of an RCN graph according to various aspects of the present disclosure.

FIG. 7 is a schematic illustration of a non-limiting example embodiment of an RCN graph according to various aspects of the present disclosure.

At a high-level, the RCN graph includes two layers: a mission layer that includes mission nodes, and a candidate layer that includes candidate nodes. As mentioned above, the MPA engine 410 generates a set of candidates for a mission. In the RCN graph, a mission node is added for the mission in the mission layer, and candidate nodes for the set of candidates are added in the mission layer. If a candidate node is associated with a mission node, a cross-layer edge connects the mission node to the candidate node. If candidate nodes conflict with each other, a candidate layer edge connects the conflicting candidate nodes. As such, if there is a path in the RCN graph via cross-layer edges and candidate layer edges from a first mission node to a second mission node, then the first mission node has at least one candidate node that conflicts with a candidate node of the second mission node. Such mission nodes will be further connected in the RCN graph via a mission layer edge. The mission layer edge may include an indication of the number of conflicting candidate nodes shared by the mission nodes (i.e., the number of different paths from the first mission node to the second mission node.

In FIG. 7, a simple RCN graph having a first mission node 702, a second mission node 704, and a third mission node 706 is shown. The first mission node 702 is associated with a first candidate node 708. The second mission node 704 is associated with a second candidate node 710 and a third candidate node 712. The third mission node 706 is associated with a fourth candidate node 714 and a fifth candidate node 716. Each of the mission nodes is connected by a cross-layer edge to the candidate nodes it is associated with. For sake of illustration, each of the candidate nodes includes an identification of a UAV 104, an autoloader 110, and a timed space reservation for a volume of airspace 108. A conflict would occur with respect to the indivisible resources 120 if the same resource is being used by two candidate nodes for overlapping time periods. A conflict would occur with respect to airspace 108 if any point in the indicated volumes overlap for the indicated time periods.

As shown, the resources 118 listed by the first candidate node 708 do not conflict with the resources of any of the other candidate nodes. Accordingly, there are no candidate layer edges connecting to first candidate node 708. The second candidate node 710 and the third candidate node 712 both list the same autoloader 110 for the same time period, and so are in conflict. Accordingly, a candidate layer edge connects second candidate node 710 to third candidate node 712. Likewise, the fourth candidate node 714 and the fifth candidate node 716 both list the same autoloader 110 for the same time period, and are also connected by a candidate layer edge. Since each of these conflicts are between candidate nodes associated with the same mission node, they do not result in the presence of any mission layer edges. However, the third candidate node 712 and the fifth candidate node 716 reference the same UAV 104 for overlapping time periods. As such, the third candidate node 712 and the fifth candidate node 716 are also in conflict, and are connected by a candidate layer edge. Since the third candidate node 712 is associated with the second mission node 704 and the fifth candidate node 716 is associated with the third mission node 706, the conflict between them results in a mission layer edge being present between the second mission node 704 and the third mission node 706 to indicate that these mission nodes have conflicting candidate nodes. The efficiencies from these data structures will be described below.

The RCN graph may be stored and managed using any suitable techniques and technology. In some embodiments, a globally distributed data store, such as a Spanner database, may be used, in order to obtain the technical advantages of scalability and capacity provided by such technologies. In some embodiments, regardless of the platform used, techniques for updating the RCN graph may maintain ACID status (Atomicity, Consistency, Isolation, and Durability). For Atomicity, functions that mutate the state of the RCN graph may be rolled back if not all constituent mutation operations succeed, such that the state is unchanged upon any failure.

For Consistency, the state of the RCN graph may be consistent after any operation that modifies the RCN graph. The state of the RCN graph is considered consistent if node consistency, edge consistency, geospatial index consistency, and mutation consistency are all maintained. Node consistency is considered maintained if all mission nodes represent missions that have been added to the RCN graph but not yet removed, and if all candidate nodes represent candidates that have been added to the RCN graph but not yet removed. Edge consistency may be broken into cross-layer edge consistency, candidate layer edge consistency, and mission layer edge consistency. Cross-layer edge consistency is maintained when there is an edge between each candidate node and its associated mission node, and there are no edges between a candidate node and a mission node that it is not a candidate node for. Candidate layer edge consistency is maintained when there are edges between non-sibling candidate nodes that conflict with each other. Mission layer edge consistency is maintained when, if a pair of mission nodes have candidate nodes with edges between them, there is an edge between the pair of mission nodes that has a count of the number of conflicting pairs of candidate nodes between the mission nodes. Geospatial index consistency is maintained when all candidate nodes that have been added to the RCN graph but not yet removed have corresponding entries within the geospatial lookup table 616. Mutation consistency may be tracked using mutated components consistency or mutated-adjacency nodes consistency. Mutated components consistency is maintained when all mission nodes reachable from mission nodes whose adjacency information has been updated since the last time a mutated components store was cleared are captured in their respective connected components of the mutation list 618. Mutated-adjacency nodes consistency is maintained when all mission nodes whose adjacency information is updated as a result of all graph mutation operations from the time when the mutated-adjacency store was last cleared are captured in the mutation list 618.

For Isolation, this may be maintained for reads of mutated components if, at the time of a read from state storage internal to the RCN graph, the latest committed state is returned. In some embodiments, there may be no guarantees between a time of a read from state storage to a time when the mutated clusters are determined from the read state and returned, such that it is possible that another mutation to the RCN graph changes the state. For read-modify-writes (e.g., adding or removing mission nodes or candidate nodes, removing committed candidates, clearing the mutation list 618, etc.), these may be guaranteed to be isolated, such that the order in which they are issued does not matter so that any ordering produces the same final state.

For Durability, the state of the RCN graph may be durable, such that the committed state stays committed and is not lost on account of infrastructure outages or task restarts. In some embodiments, this level of durability may be provided at least in part by the data store infrastructure itself (e.g., Spanner).

In order to achieve ACID status and avoid lock contention when there are multiple competing transactions associated with mutations that map to the same geospatial time slice, some embodiments may use a batching strategy to achieve throttling of database transactions. In some embodiments, batches to be committed to the RCN graph may cover a predetermined batch time span (e.g., five seconds or less, or some other suitable time span), may correspond to a given geographical area (e.g., a level 7 S2Cell), and may accumulate all operations whose mission nodes and candidate nodes map to the S2Cell the batch represents. At expiration of the batch, all accumulated mutations may be executed atomically. Each batch may be created when a mutation occurs and a batch eligible to capture it based on these criteria does not yet exist.

Figure 8A:
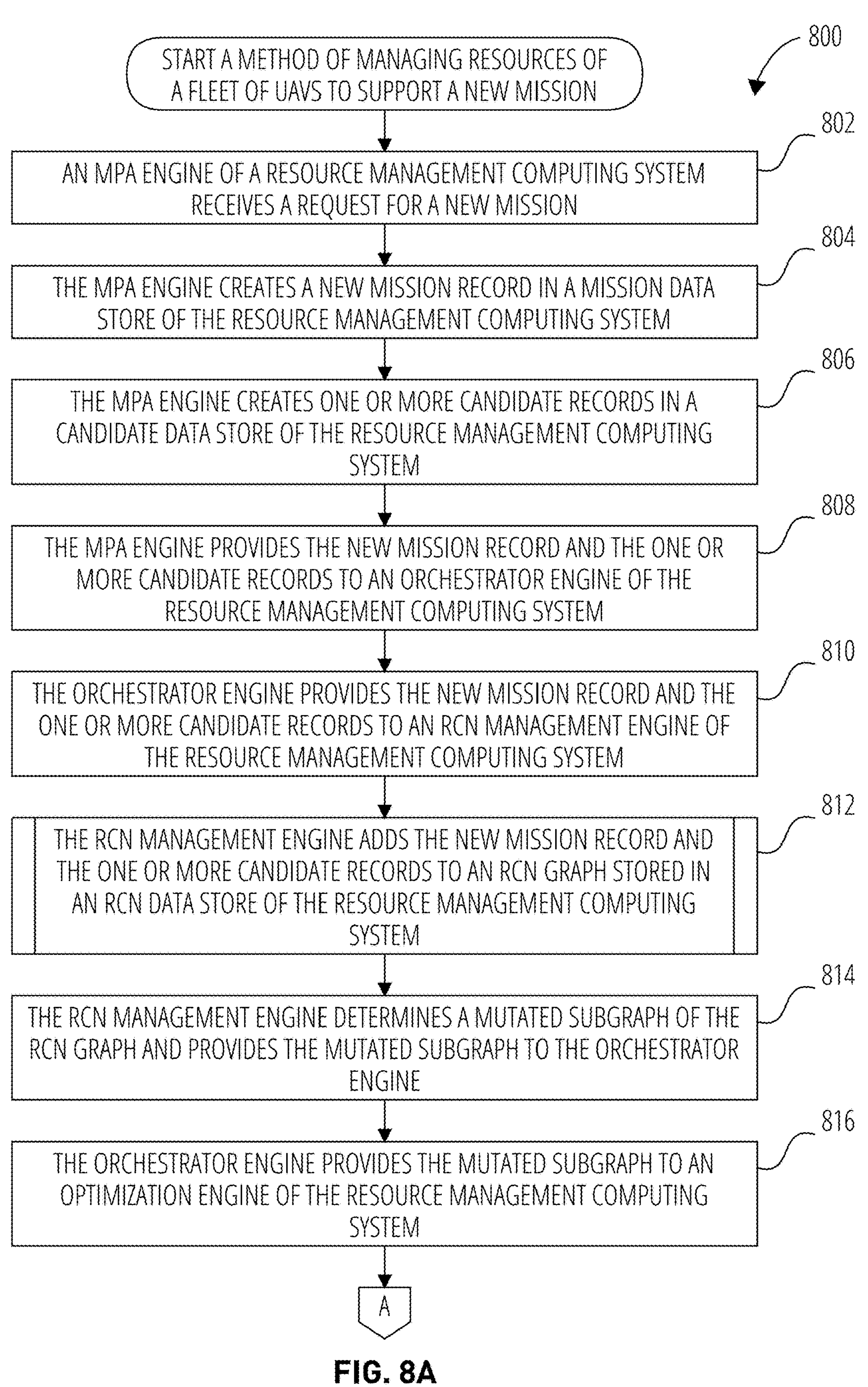
FIG. 8A-FIG. 8B are a flowchart that illustrates a non-limiting example embodiment of a method of managing resources of a fleet of UAVs to support a new mission, according to various aspects of the present disclosure.
Figure 8B:
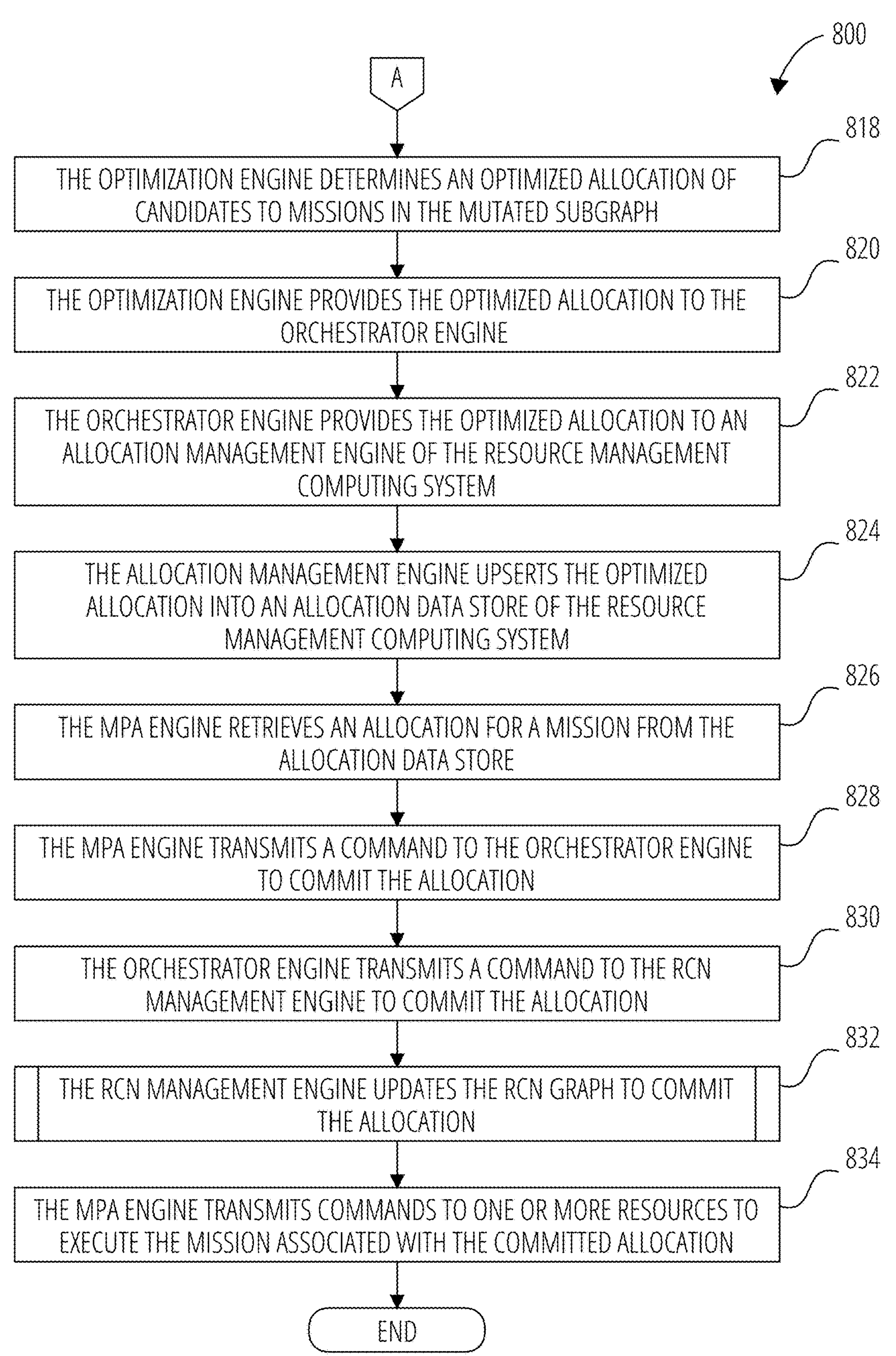

FIG. 8A-FIG. 8B are a flowchart that illustrates a non-limiting example embodiment of a method of managing resources of a fleet of UAVs to support a new mission, according to various aspects of the present disclosure. In the method 800, a resource management computing system 102 receives requests to service missions using the resources 118 available to the resource management computing system 102. The resource management computing system 102 efficiently determines allocations of the resources 118, and commits resources 118 to cause the missions to be serviced.

From a start block, the method 800 proceeds to block 802, where an MPA engine 410 of a resource management computing system 102 receives a request for a new mission. The MPA engine 410 may receive the request for the new mission from any suitable source. In some embodiments, the request for the new mission may be received as part of an order for a package delivery from a consumer, from a retailer in association with such an order. In some embodiments, the request for the new mission may be created by a system configured to manage an overarching goal, such as conducting an aerial survey or surveillance of a geographic area. In some embodiments, the request for the new mission may be created manually by a pilot or other controller. The new mission may be intended to accomplish one or more types of tasks, including but not limited to a package delivery mission for delivering a package from a pickup location to a drop-off location, a FitBIT mission that helps calibrate a UAV 104, a GeoBIT mission that helps initialize an on-board navigation system based on vision and GNSS measurements by making the UAV 104 execute a specific maneuver where such measurements become simultaneously available, a sensing mission that collects imagery or other sensing information of a geographic area, a ferry mission that moves a UAV 104 from a first location to a second location, or other types of missions.

At block 804, the MPA engine 410 creates a new mission record in a mission data store 422 of the resource management computing system 102. The new mission record may include information that defines the new mission for planning purposes. For example, for a sensing mission, the new mission record may include a geographic area to be sensed and one or more types of sensing information to be collected. As another example, for a package delivery mission, the new mission record may include a pickup location from which a package will be picked up, relevant characteristics of the package (e.g., a size, a weight, a hazardous material identification, etc.), a drop-off location to which the package will be delivered, and/or other characteristics of the package delivery.

At block 806, the MPA engine 410 creates one or more candidate records in a candidate data store 424 of the resource management computing system 102. A candidate record is an identification of a set of resources 118 capable of completing the mission, regardless of availability. For example, a candidate record for a package delivery mission may identify a UAV 104, a landing pad 106 to be used at the end of the mission, an area of airspace 108 a flight plan passes through, an autoloader 110 for the package to be used at the pickup location, and/or other resources 118 for completing the package delivery mission. In some embodiments, to create a given candidate record, the MPA engine 410 may randomly assign resources 118 from at least some categories of resources 118 for fulfilling the mission (e.g., a random UAV 104, a random autoloader 110 at the pickup location, a random landing pad 106, etc.), and may plan other resources 118 (e.g., airspace 108 associated with a flight plan) based on those randomly assigned resources 118. In some embodiments, the MPA engine 410 may create a predetermined number of unique candidate records for the new mission. In some embodiments, the MPA engine 410 may create as many unique candidate records as possible (e.g., every combination of resources 118 capable of fulfilling the new mission).

Once the new mission record and the one or more candidate records are created, the resource management computing system 102 uses the RCN graph to efficiently determine an optimal candidate record to assign to the new mission. Accordingly, at block 808, the MPA engine 410 provides the new mission record and the one or more candidate records to an orchestrator engine 412 of the resource management computing system 102. The orchestrator engine 412 handles communication between other components of the resource management computing system 102, such that the different tasks provided by those components may be efficiently parallelized or otherwise distributed between computing devices.

Figure 9A:
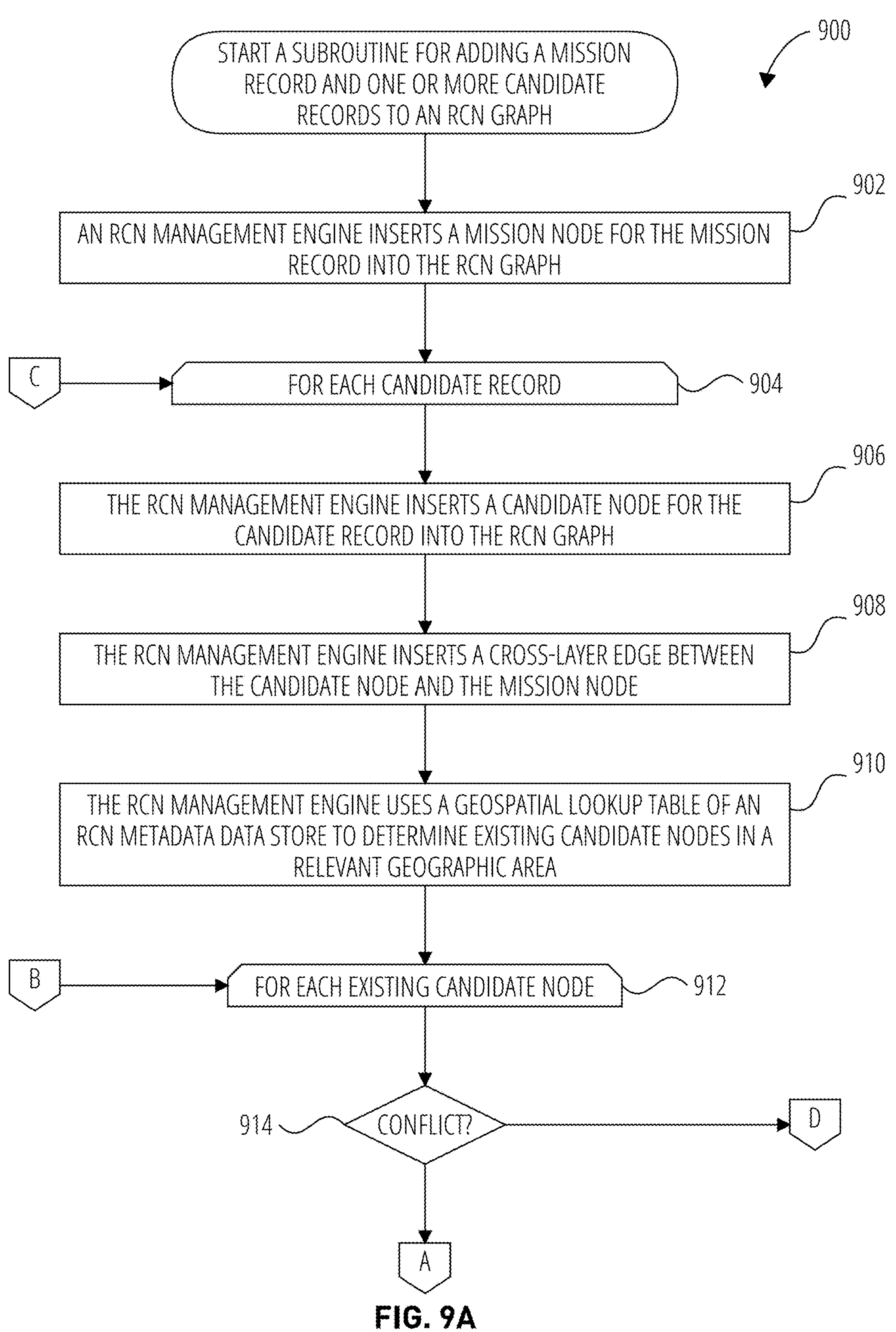
FIG. 9A-FIG. 9B are a flowchart that illustrates a non-limiting example embodiment of a subroutine for adding a mission record and one or more candidate records to an RCN graph, according to various aspects of the present disclosure.
Figure 9B:
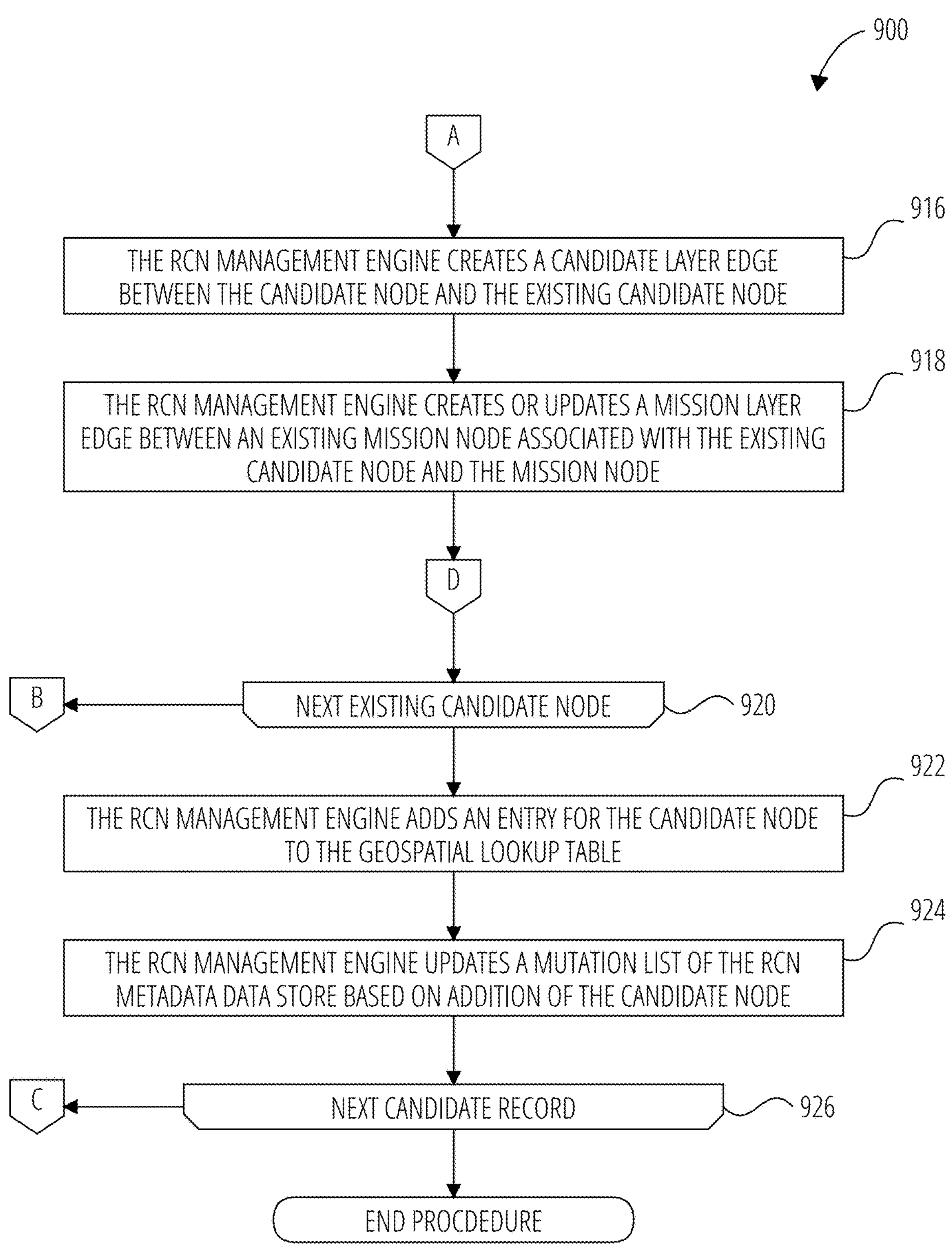

At block 810, the orchestrator engine 412 provides the new mission record and the one or more candidate records to an RCN management engine 416 of the resource management computing system 102. The method 800 then advances to subroutine block 812, where a procedure is executed wherein the RCN management engine 416 adds the new mission record and the one or more candidate records to an RCN graph stored in an RCN data store 408 of the resource management computing system 102. Any suitable subroutine may be used by the RCN management engine 416 to add the new mission record and the one or more candidate records to the RCN graph that maintains consistency as discussed above. One non-limiting example of a suitable subroutine is illustrated in FIG. 9A-FIG. 9B and is described in further detail below.

At block 814, the RCN management engine 416 determines a mutated subgraph of the RCN graph and provides the mutated subgraph to the orchestrator engine 412. In some embodiments, the mutated subgraph may be returned from the procedure executed in subroutine block 812. In some embodiments, the content of the mutated subgraph may be retrieved from the mutation list 618, or determined by the RCN management engine 416 in some other way. At block 816, the orchestrator engine 412 provides the mutated subgraph to an optimization engine 418 of the resource management computing system 102.

The method 800 then advances to a continuation terminal ("terminal A"). From terminal A (FIG. 8B), the method 800 advances to block 818, where the optimization engine 418 determines an optimized allocation of candidates to missions in the mutated subgraph, and at block 820, the optimization engine 418 provides the optimized allocation to the orchestrator engine 412. Typically, determining optimal allocations involves assigning utility values to potential allocations, and performing calculations to determine selected allocations that result in a maximum total utility.

In some embodiments, resource utilities may be defined for each mission with respect to each individual resource. For example, utilities may be specified for each type of UAV 104 of multiple types of UAVs 104 for a given delivery mission (e.g., a higher utility for a more efficient type of UAV 104), or for earlier estimated times of arrival versus later estimated times of arrival. Alternatively, utilities may be defined for each mission with respect to each of its candidates (e.g., a higher utility for a first candidate than for a second candidate, due to some combination of resources in the candidates). Resource utilities may be specified in an ordinal format or a cardinal format. Ordinal utilities may not be numerically quantified, but may be useful to rank resources in preferential order of their missions. Cardinal utilities, on the other hand, may be numerically quantified.

In some embodiments, cardinal utilities may be constructed from ordinal utilities. Examples of ordinal versus cardinal utilities are provided in Table 1.

TABLE 1

| | Ordinal | Cardinal |
|---|---|---|
| Individual resource | Mission A prefers UAV P over UAV Q. Mission A prefers landing pad X over landing pad Y. | Mission A attributes 10 utils to UAV P and 5 utils to UAV Q. Mission A attributes 9 utils to landing pad X and 8 utils to landing pad Y. |
| Candidate | Mission A prefers candidate (UAV P, landing pad X) over candidate (UAV Q, landing pad Y). | Mission A attributes 12 utils to candidate (UAV P, landing pad X) and 11 utils to candidate (UAV Q, landing pad Y). |

The determination of the optimized allocation may involve individual utility functions and/or global utility functions. Individual utility functions provide cardinal or ordinal utilities for individual candidates or resources 118. Some examples of cardinal individual utility functions include, but are not limited to, expected aircraft battery usage, or mission completion timespan associated with the candidate flight plan. Global utility functions represent a measure of how good an allocation of candidates to a set of missions is. These functions may also provide cardinal or ordinal utilities (ordinal over the space of allocations). Any suitable measure of global utility may be used, including but not limited to a utilitarian social welfare global utility (a cardinal utility measure that operates on individual cardinal utilities, and is the sum of provided individual cardinal utility scores), a Nash social welfare global utility (a cardinal utility measure that operates on individual cardinal utilities, and is the geometric mean of the provided individual cardinal utility scores), an egalitarian social welfare global utility (a cardinal utility measure that operates on individual cardinal utilities, and is the minimum of the provided individual cardinal utility scores), or others.

The allocation problem for determining the allocation that maximizes the utility may be formulated and solved in any suitable way. In some embodiments, a single-objective utility formulation may be used. In such a formulation, given a set of missions where each mission has a set of candidates with individual utilities specified, the optimization engine 418 attempts to find an allocation that maximizes global utility over the space of conflict-free allocations. Individual utilities can be ordinal or cardinal, and the solution may be determined using any suitable technique, including but not limited to integer programming (e.g., using the SCIP solver), an exhaustive search allocation, random priority candidate allocation, auction techniques, stochastic optimization, population methods, belief propagation, or other techniques. In some embodiments, a multi-objective utility formulation may be used. In such a formulation, given a set of missions where each mission has a set of candidates with individual utilities specified, the optimization engine 418 attempts to find an allocation that is Pareto-optimal with respect to the global utilities over the space of conflict-free allocations. As each of the optimization techniques can be computationally difficult, using the RCN graph and computing a result for the optimization problem over merely the mutated subgraph instead of the entire RCN graph helps to improve the speed of the allocation by reducing the amount of computing resources required, and to thereby allow the optimization to scale to support a large number of resources 118 and concurrently planned missions.

At block 822, the orchestrator engine 412 provides the optimized allocation to an allocation management engine 420 of the resource management computing system 102, and at block 824, the allocation management engine 420 upserts the optimized allocation into an allocation data store 414 of the resource management computing system 102. The upsert operation inserts a record for the allocation for each particular mission if an allocation did not already exist for the mission in the allocation data store 414. If an allocation did already exist for a given mission in the allocation data store 414, then the upsert operation updates the stored allocation for the mission if a timestamp of the new allocation is more recent than that of the stored allocation. This helps ensure consistency of the stored allocations, even if allocations are being performed in parallel.

Once the allocations are stored in the allocation data store 414, they may be retrieved at any time. Accordingly, at block 826, the MPA engine 410 retrieves an allocation for a mission from the allocation data store 414. In some embodiments, the MPA engine 410 may perform this automatically (e.g., the MPA engine 410 may retrieve all allocations from the allocation data store 414, or may periodically check to see if an allocation has been generated for a given mission). In some embodiments, this may occur as a result of a pilot, overseer, or other operator requesting an allocation for a mission.

In some embodiments, the MPA engine 410 generates or receives an indication that the allocation for a mission should be committed. In some embodiments, the MPA engine 410 may automatically confirm that the allocation for a given mission should be committed. In some embodiments, the MPA engine 410 may receive a confirmation that the allocation is acceptable (e.g., after review by a pilot, overseer, or other operator; or from a customer after confirming an estimated delivery time or other characteristic of the allocated candidate for the mission).

Assuming the allocation for the mission was determined to be acceptable, at block 828, the MPA engine 410 transmits a command to the orchestrator engine 412 to commit the allocation. If the allocation had been determined to be unacceptable, then the method 800 may instead return to block 818 to generate a different allocation.

At block 830 the orchestrator engine 412 transmits a command to the RCN management engine 416 to commit the allocation, and at subroutine block 832, the RCN management engine 416 updates the RCN graph to commit the allocation. In some embodiments, committing an allocation causes the mission node and the associated candidate nodes to be removed from the RCN graph, along with appropriate conflicting candidate nodes that include resources 118 that were committed to the allocation (and are therefore unavailable for other missions), and appropriate edges. Any suitable technique that maintains the consistency of the RCN graph may be used, including but not limited to the subroutine illustrated in FIG. 11 and described in further detail below. Upon success, the orchestrator engine 412 may also cause the allocation to be deleted from the allocation data store 414.

At block 834, the MPA engine 410 transmits commands to one or more resources to execute the mission associated with the committed allocation. For example, the MPA engine 410 may transmit a navigation path and/or other information to the UAV 104 associated with the committed allocation, and the UAV 104 may autonomously perform the mission based on the information. As another example, the MPA engine 410 may transmit a notification to an operator at a pickup location associated with the mission that informs the operator of the incoming UAV 104 and instructs the operator to prepare a package for pickup at an autoloader 110 associated with the mission.

The method 800 then advances to an end block and terminates.

FIG. 9A-FIG. 9B are a flowchart that illustrates a non-limiting example embodiment of a subroutine for adding a mission record and one or more candidate records to an RCN graph, according to various aspects of the present disclosure. The subroutine 900 is a non-limiting example of a subroutine suitable for use at subroutine block 812 of FIG. 8A. In the subroutine 900, nodes representing the mission record and the one or more candidate records are added to the RCN graph in a way that maintains consistency of the RCN graph.

From a start block, the subroutine 900 advances to block 902, where an RCN management engine 416 inserts a mission node for the mission record into the RCN graph. The subroutine 900 then advances to a for-loop defined between a for-loop start block 904 and a for-loop end block 926, wherein each candidate record of the one or more candidate records is processed to be added to the RCN graph.

From for-loop start block 904, the subroutine 900 advances to block 906, where the RCN management engine 416 inserts a candidate node for the candidate record into the RCN graph. At block 908, the RCN management engine 416 inserts a cross-layer edge between the candidate node and the mission node. The cross-layer edge indicates that the candidate node represents a candidate set of resources 118 to be used for the mission associated with the mission node.

At block 910, the RCN management engine 416 uses a geospatial lookup table 616 of an RCN metadata data store 614 to determine existing candidate nodes in a relevant geographic area. In some embodiments, the relevant geographic area is sized based on a maximum range of the UAVs 104 managed by the resource management computing system 102, such that any potentially overlapping flight plans based on this maximum range would be included. For example, the relevant geographic area may be a level 7 S2Cell that includes a start point of a flight plan of the candidate node, as well as the eight neighboring level 7S2Cells of this cell. In embodiments wherein the geospatial lookup table 616 indexes candidate nodes based on their level 7 S2Cell, all existing candidate nodes from this relevant geographic area may be quickly and efficiently retrieved. In embodiments wherein the UAVs 104 have longer or shorter maximum flight ranges, a different level S2Cell may be appropriate for use to define the relevant geographic area.

The subroutine 900 then advances to a for-loop defined between a for-loop start block 912 and a for-loop end block 920 wherein each of the existing candidate nodes in the relevant geographic area is processed. From for-loop start block 912, the subroutine 900 advances to decision block 914, where a determination is made regarding whether there is a conflict between the existing candidate node and the candidate node being added. In some embodiments, the RCN management engine 416 compares each resource 118 referenced by the existing candidate node and each corresponding resource 118 referenced by the candidate node being added to determine if any of the resources 118 conflict. A conflict may exist between an existing candidate node and the candidate node being added if there is any resource 118 that overlaps to any extent between the existing candidate node and the candidate node being added. For example, if the existing candidate node and the candidate node being added both reference the same indivisible resource 120 (e.g., the same UAV 104, the same landing pad 106, the same autoloader 110, etc.) for overlapping periods of time, a conflict may exist. As another example, if the existing candidate node and the candidate node being added reference overlapping portions of airspace 108 during an overlapping period of time, a conflict may exist. As yet another example, if the existing candidate node and the candidate node being added collectively consume more than an available amount of a divisible resource 116 at overlapping times, a conflict may exist.

If there are no conflicts, then the result of decision block 914 is NO, and the subroutine 900 advances to the for-loop end block 920 via a continuation terminal ("terminal D"). Otherwise, if there is a conflict, then the result of decision block 914 is YES, and the subroutine 900 advances to a continuation terminal ("terminal A").

From terminal A (FIG. 9B), the subroutine 900 advances to block 916, where the RCN management engine 416 creates a candidate layer edge between the candidate node and the existing candidate node. The candidate layer edge indicates that there is a conflict between the candidate node and the existing candidate node. In some embodiments, since the existence of the conflict is the important information to track (as opposed to the specific resource 118 that is in conflict between the candidate nodes), the candidate layer edge merely references the candidate node and the existing candidate node, as opposed to providing a more detailed reference to a specific resource 118 within the candidate node and the existing candidate nodes. In some embodiments, the candidate layer edge may also identify the resource 118 in conflict.

At block 918, the RCN management engine 416 creates or updates a mission layer edge between an existing mission node associated with the existing candidate node and the mission node. Since each existing candidate node will have a cross-layer edge connecting the existing candidate node to its associated existing mission node, the RCN management engine 416 may find the existing mission node by following the cross-layer edge of the existing candidate node. The mission layer edge connecting the mission node and the existing mission node indicates that there is a conflict between candidates of the mission node and the existing mission node. In some embodiments, the mission layer edge may include a counter that tracks a number of conflicting candidate nodes shared between the mission node and the existing mission node. As such, the mission layer edge between the existing candidate node and the mission node may already be present, and the RCN management engine 416 may increment the counter at block 918.

The subroutine 900 then advances to terminal D, and then to the for-loop end block 920. If further existing candidate nodes that could potentially conflict with the candidate node were found and have not yet been processed, then the subroutine 900 advances to a continuation terminal ("terminal B") in order to return to the for-loop start block 912 and process the next existing candidate node. Otherwise, if all of the existing candidate nodes have been processed, then the subroutine 900 advances from for-loop end block 920 to block 922.

At block 922, the RCN management engine 416 adds an entry for the candidate node to the geospatial lookup table 616. As noted above, the entry for the candidate node in the geospatial lookup table 616 may index the candidate node by a level 7 S2Cell (or other indicator of a geographic area) associated with a takeoff location of the candidate node (or another geographic point associated with the candidate node).

At block 924, the RCN management engine 416 updates a mutation list 618 of the RCN metadata data store 614 based on the addition of the candidate node. In some embodiments, the mutation list 618 may store a running list of all connected components of the candidate node (e.g., the candidate node, and every node in the RCN graph reachable from the candidate node). In some embodiments, instead of storing all of the connected components, the mutation list 618 may store nodes whose adjacency information has changed (e.g., the candidate node and its immediate siblings), and the remainder of the reachable nodes may be retrieved from the RCN graph when needed.

The subroutine 900 then advances to the for-loop end block 926. If further candidate records remain to be processed, then the subroutine 900 advances to a continuation terminal ("terminal C") to return to the for-loop start block 904 to process the next candidate record. Otherwise, if all of the candidate records have been processed, then the subroutine 900 advances from for-loop end block 926 to an end block to return control to its caller.

The actions of the subroutine 900 may be performed in memory, as opposed to using writes to persistent storage. For example, prior to block 902, the RCN management engine 416 may use the geospatial lookup table 616 to retrieve all nodes and edges related to a level 7 S2Cell related to the mission record (e.g., all nodes and edges from a level 7 S2Cell associated with a takeoff location of the mission, along with all nodes and edges from the eight neighboring level 7 S2Cells) from persistent storage into memory, and the operations of the subroutine 900 may thereafter be performed using the in-memory copy of the nodes. Further manipulation of these nodes may be performed in memory until committed to persistent storage in a batch transaction. In addition to accelerating the actions of the subroutine 900, committing the operations in a single batch transaction helps maintain consistency of the RCN graph as discussed above.

FIG. 10A-FIG. 10E are schematic illustrations of the addition of a mission node and candidate nodes to an RCN graph according to various aspects of the present disclosure. The actions illustrated in FIG. 10A-FIG. 10E are similar to the actions described in the subroutine 900 illustrated in FIG. 9A-FIG. 9B, although the order of some operations may be different. For example, while the subroutine 900 processes each candidate record separately, the illustrations in FIG. 10A-FIG. 10E illustrate the processing of each candidate record at the same time for the sake of clarity and brevity. One of ordinary skill in the art will recognize that in some embodiments, at least some of the parallel actions illustrated in FIG. 10A-FIG. 10E may occur sequentially for each added node. One of ordinary skill in the art will also recognize that in some embodiments, at least some of the sequential actions illustrated in FIG. 9A-FIG. 9B may occur in parallel for two or more added nodes.

To start, the illustrated RCN graph includes the elements of the RCN graph illustrated in FIG. 7 and discussed above: a first mission node 702 is associated with a first candidate node 708, a second mission node 704 is associated with a second candidate node 710 and third candidate node 712, and a third mission node 706 is associated with a fourth candidate node 714 and a fifth candidate node 716. Because the third candidate node 712 and the fifth candidate node 716 have a conflict (the same UAV 104 is referenced for overlapping periods of time in the third candidate node 712 and the fifth candidate node 716), a candidate layer edge connects the third candidate node 712 and the fifth candidate node 716, and a mission layer edge connects the second mission node 704 and the third mission node 706.

Figure 10A:
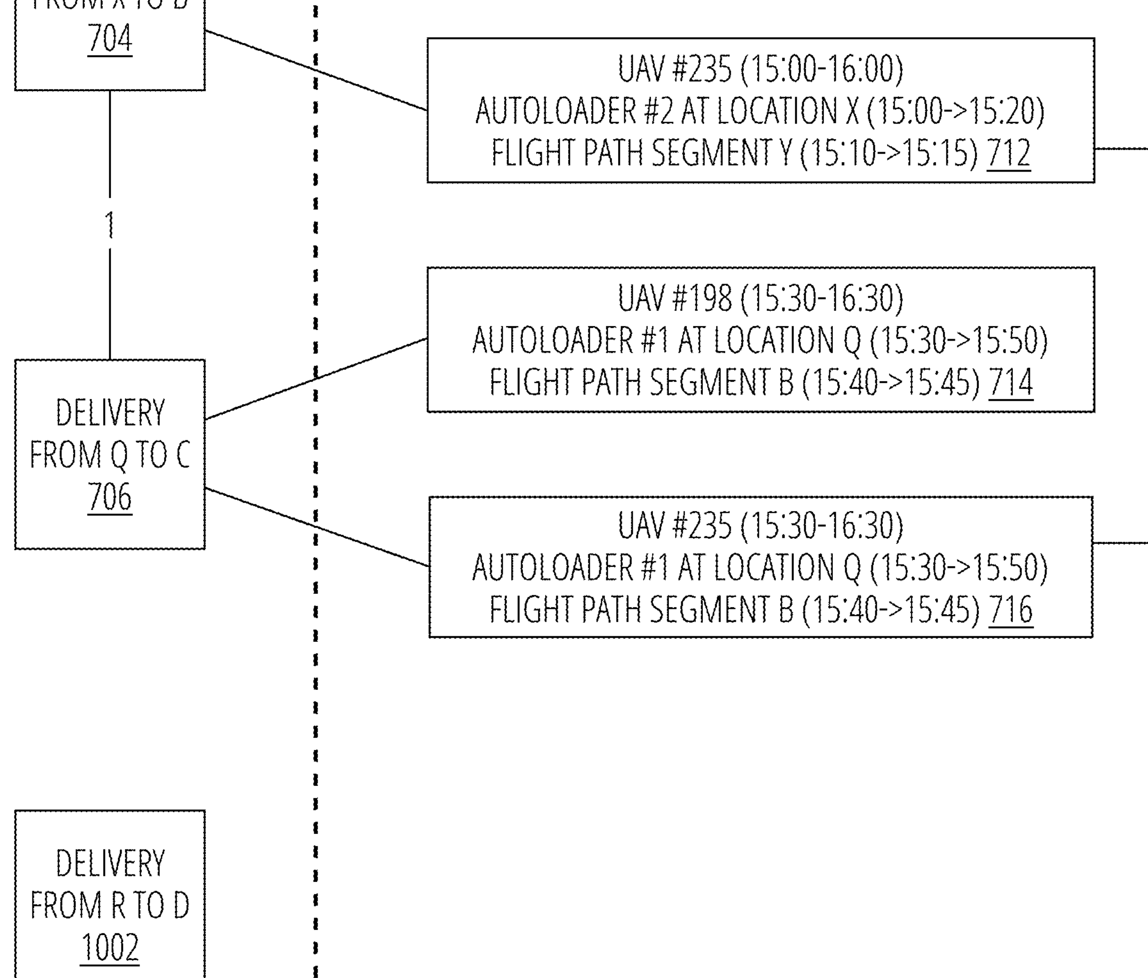

In FIG. 10A, a new mission node 1002 is added to the RCN graph. This action corresponds to block 902 of FIG. 9A. In FIG. 10B, a first new candidate node 1004 and a second new candidate node 1006 are added to the RCN graph. The addition of each candidate node corresponds to block 906 of FIG. 9A. In FIG. 10C, a cross-layer edge is added between the new mission node 1002 and the first new candidate node 1004, and between the 1002 and the second new candidate node 1006, corresponding to block 908 of FIG. 9A and indicating that the candidate nodes are associated with the new mission node 1002.

Figure 10D:
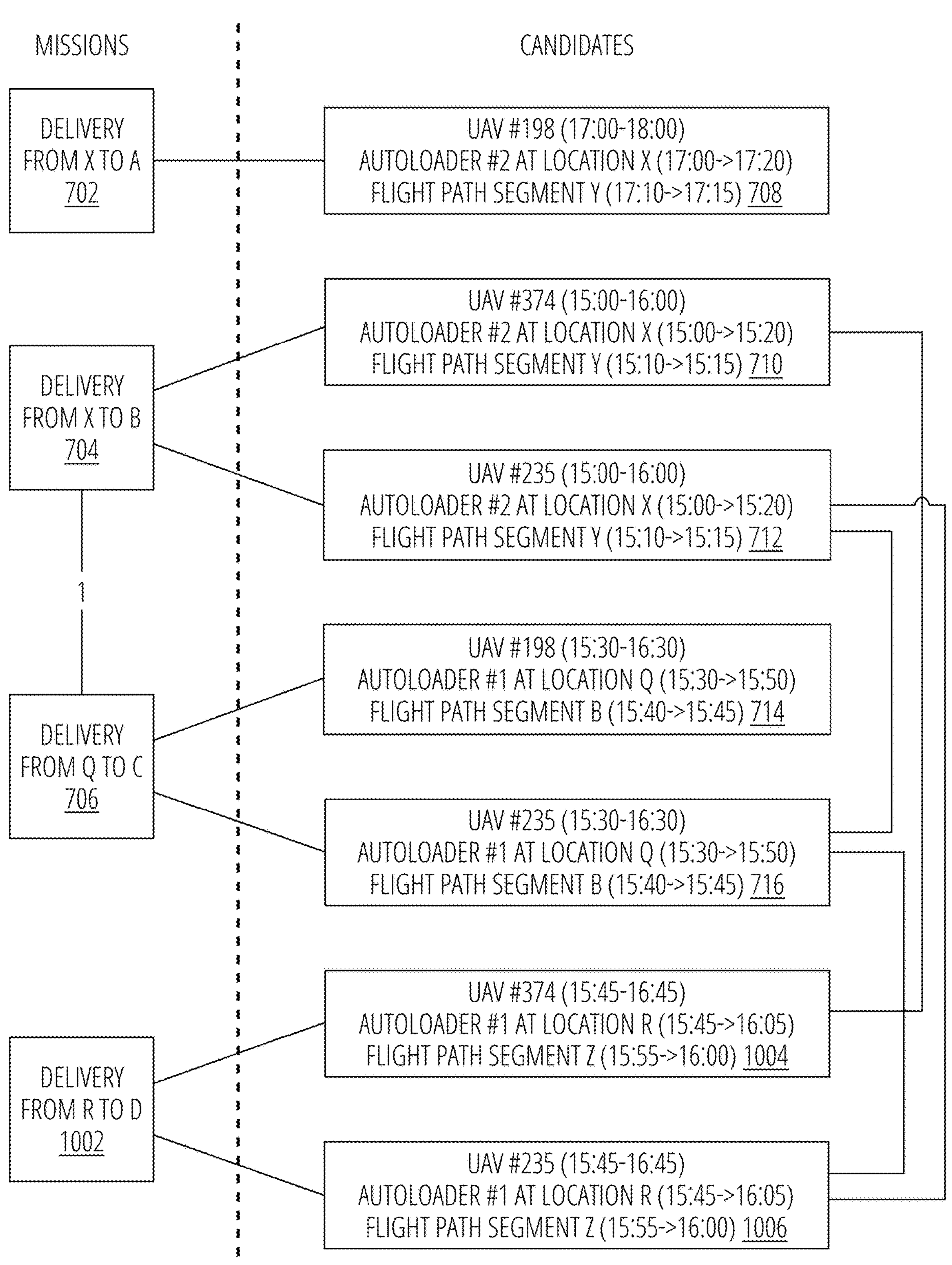

FIG. 10D illustrates the result of checking for conflicts between the first new candidate node 1004 and the second new candidate node 1006 versus the existing candidate nodes, as described in the subroutine 900 from for-loop start block 912 to block 916. With respect to the first new candidate node 1004, a conflict was found with the second candidate node 710 (both the first new candidate node 1004 and the second candidate node 710 reference the same UAV 104 for overlapping periods of time). Accordingly, a candidate layer edge is added between the first new candidate node 1004 and the second candidate node 710. With respect to the second new candidate node 1006, a conflict was found with the third candidate node 712 (both the second new candidate node 1006 and the third candidate node 712 reference the same UAV 104 for overlapping periods of time), so a candidate layer edge is added between the second new candidate node 1006 and the third candidate node 712. A conflict was also found with the fifth candidate node 716 (both the second new candidate node 1006 and the fifth candidate node 716 reference the same UAV 104 for overlapping periods of time), so a candidate layer edge is added between the second new candidate node 1006 and the fifth candidate node 716. Though all of these conflicts were between referenced UAVs 104, it should be understood that other illustrated resources (e.g., autoloaders 110, airspace 108 as indicated by flight path segments, etc.) may be found to be in conflict in other embodiments.

Figure 10E:
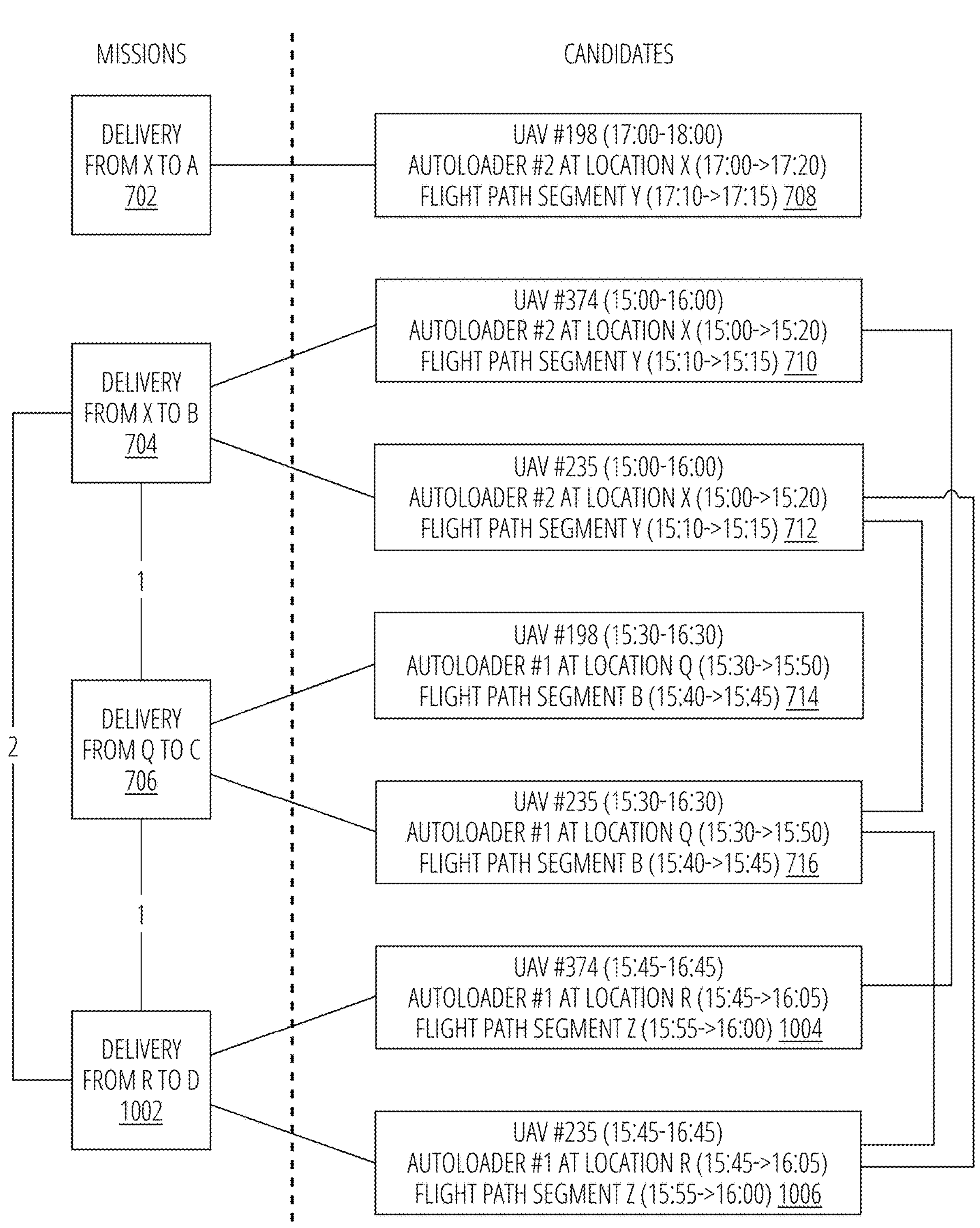

FIG. 10E illustrates the result of updating the mission layer edges, as described in block 918 of FIG. 9B. Because there is a conflict between the fifth candidate node 716 and the second new candidate node 1006, a mission layer edge is added between the third mission node 706 and the new mission node 1002. Further, because there are conflicts between the second candidate node 710 and the first new candidate node 1004 as well as between the third candidate node 712 and the second new candidate node 1006, a mission layer edge is added between the second mission node 704 and the new mission node 1002. Further, because there are two conflicting candidate nodes shared between the second mission node 704 and the new mission node 1002, the value of the counter on the mission layer mission node between these mission nodes is 2.

Figure 11:
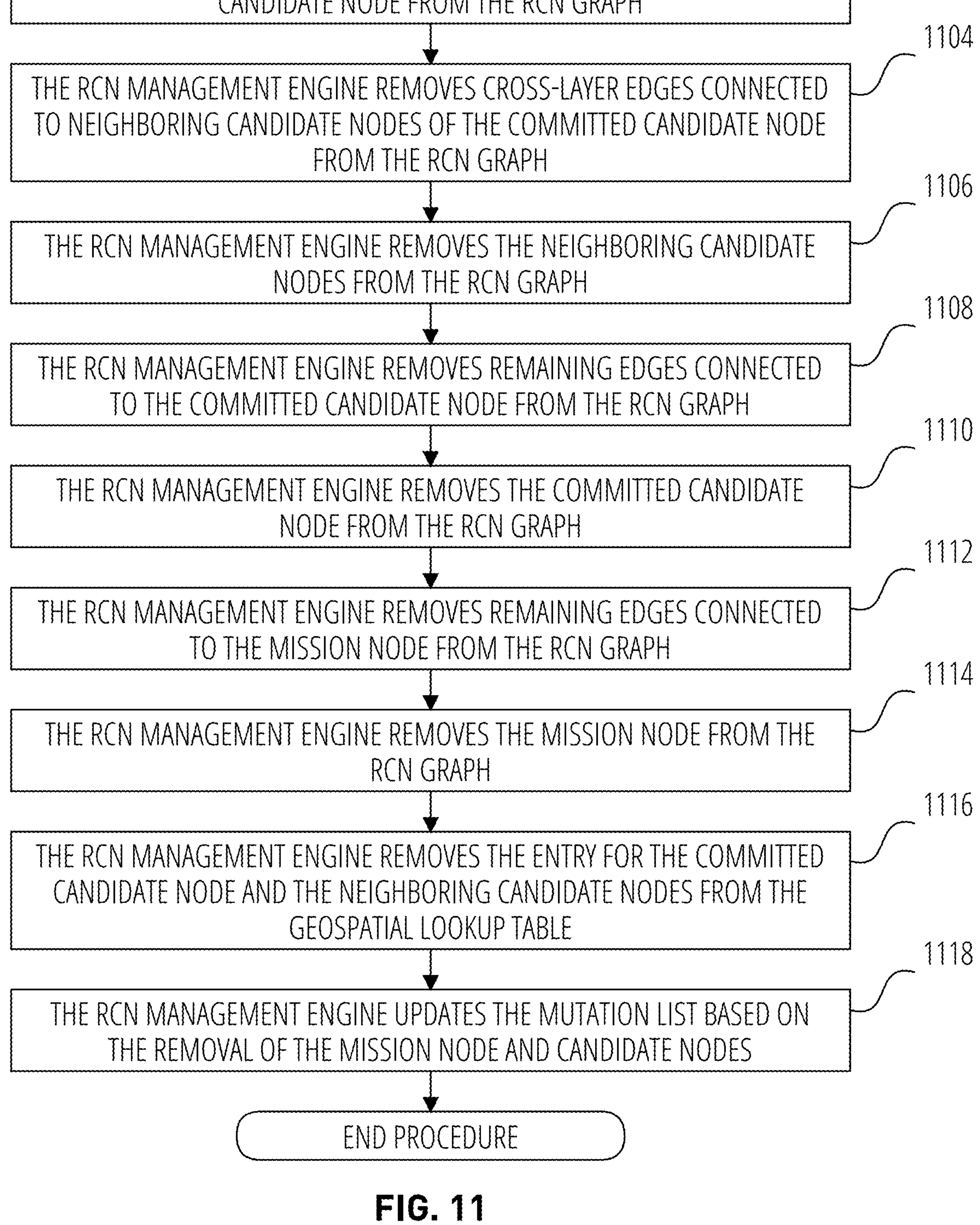
FIG. 11 is a flowchart that illustrates a non-limiting example embodiment of a subroutine for committing an allocation of a committed candidate node to a mission node in an RCN graph, according to various aspects of the present disclosure.

FIG. 11 is a flowchart that illustrates a non-limiting example embodiment of a subroutine for committing an allocation of a committed candidate node to a mission node in an RCN graph, according to various aspects of the present disclosure. The subroutine 1100 is a non-limiting example of a subroutine suitable for use at subroutine block 832 of method 800, and includes an order of operations to help guarantee consistency after every operation.

From a start block, the subroutine 1100 advances to block 1102, where the RCN management engine 416 removes candidate layer edges connected to neighboring candidate nodes of the committed candidate node from the RCN graph. At block 1104, the RCN management engine 416 removes cross-layer edges connected to the neighboring candidate nodes of the committed candidate node from the RCN graph, and at block 1106, the RCN management engine 416 removes the neighboring candidate nodes from the RCN graph. Neighboring candidate nodes include candidate nodes that conflict with the committed candidate node, as well as sibling candidate nodes (i.e., candidate nodes with cross-layer edges to the same mission node). The conflict implies that the conflicting resources will be unavailable for the neighboring candidate nodes, and so the neighboring candidate nodes should be removed from the RCN graph as well. The sibling candidate nodes should be removed from the RCN graph along with the committed candidate node because they will no longer be needed, since the mission node will be serviced by the resources of the committed candidate node. Removing the cross-layer edges and candidate layer edges connecting the neighboring candidate nodes to other nodes in the RCN graph prior to removing the neighboring candidate nodes helps guarantee consistency. In some embodiments, removing the candidate layer edges may cause conflict counters in the mission layer edges to be updated, and if a counter reaches zero (indicating that there are no remaining conflicts between the associated mission nodes), the mission layer edge for that counter may be removed.

At block 1108, the RCN management engine 416 removes remaining edges connected to the committed candidate node from the RCN graph, and at block 1110, the RCN management engine 416 removes the committed candidate node from the RCN graph. As with the neighboring candidate nodes and their associated edges, removing the edges connected to the committed candidate node prior to removing the committed candidate node itself helps maintain consistency of the RCN graph.

At block 1112, the RCN management engine 416 removes edges connected to the mission node from the RCN graph, and at block 1114, the RCN management engine 416 removes the mission node from the RCN graph. Again, removing the edges prior to removing the mission node helps maintain consistency.

At block 1116, the RCN management engine 416 removes the entry for the committed candidate node and the neighboring candidate nodes from the geospatial lookup table 616. By removing the entries from the geospatial lookup table 616, the correct elements will be returned from the geospatial lookup table 616 in response to later requests.

At block 1118, the RCN management engine 416 updates the mutation list 618 based on the removal of the mission node and candidate nodes. In some embodiments, each update to the nodes and/or edges may be inserted into the mutation list 618 when made to the RCN graph. Collecting the updates in the mutation list 618 allows the updates to be committed to persistent storage in a batch.

The block 1118 then advances to an end block and returns control to its caller.

FIG. 12A-FIG. 12H are schematic illustrations of the committing of an allocation in an RCN graph according to various aspects of the present disclosure. The actions illustrated in FIG. 12A-FIG. 12H are similar to the actions described in the subroutine 1100 illustrated in FIG. 11, although the order of some operations may be different, or may occur in parallel.

Figure 12A:
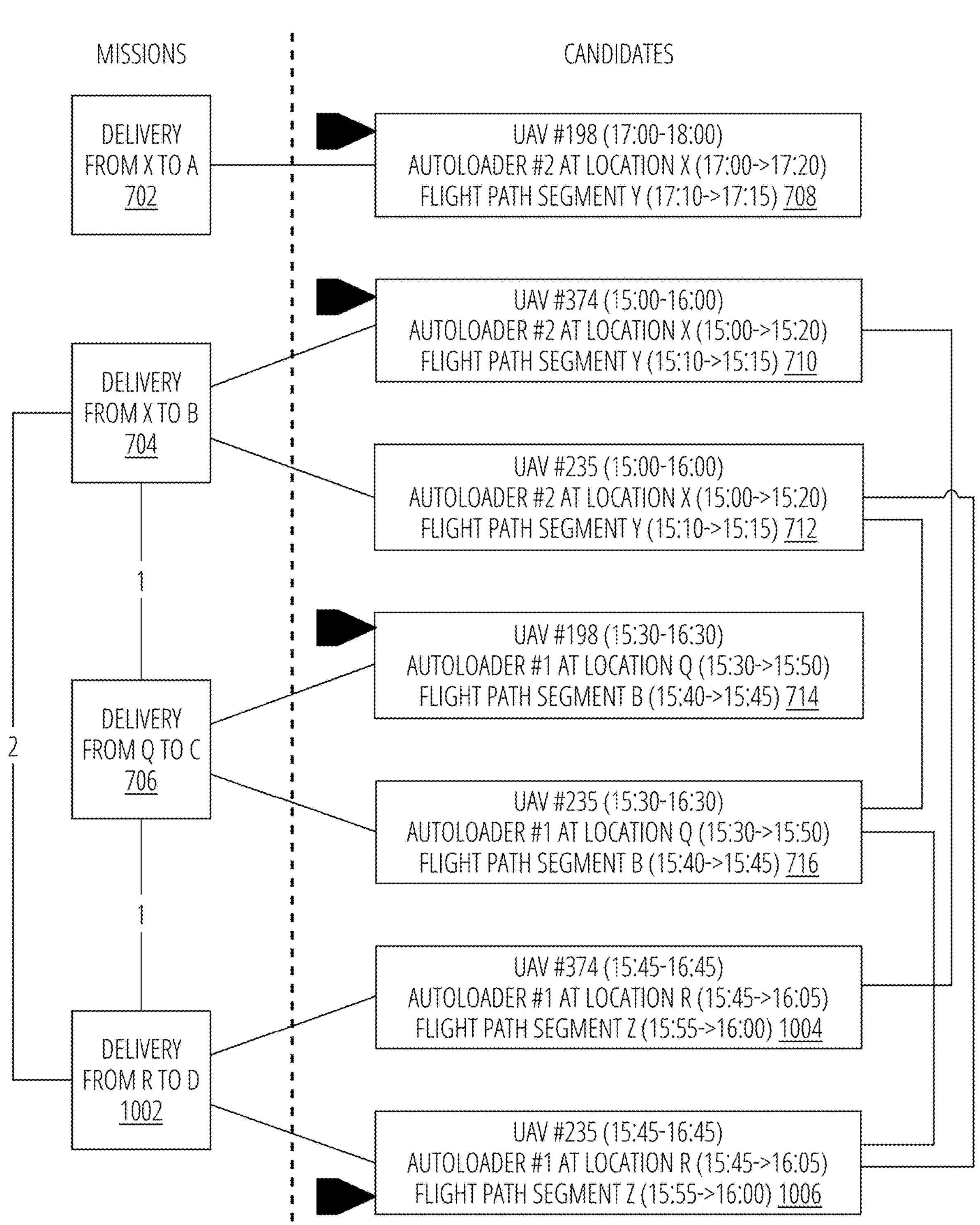
FIG. 12A-FIG. 12H are schematic illustrations of the committing of an allocation in an RCN graph according to various aspects of the present disclosure.

To start, FIG. 12A illustrates a non-limiting example of an allocation of the candidates in the RCN graph that was established in FIG. 10E. Each black arrowhead indicates an allocation of a candidate node to its corresponding mission node. It can be seen that no conflicting candidate nodes (i.e., no candidate nodes connected by a candidate layer edge) have been allocated, since such an allocation would not be valid. The remainder of FIG. 12C-FIG. 12H illustrate the result of receiving a command to commit the allocation of the second new candidate node 1006 to the new mission node 1002.

Figure 12B:
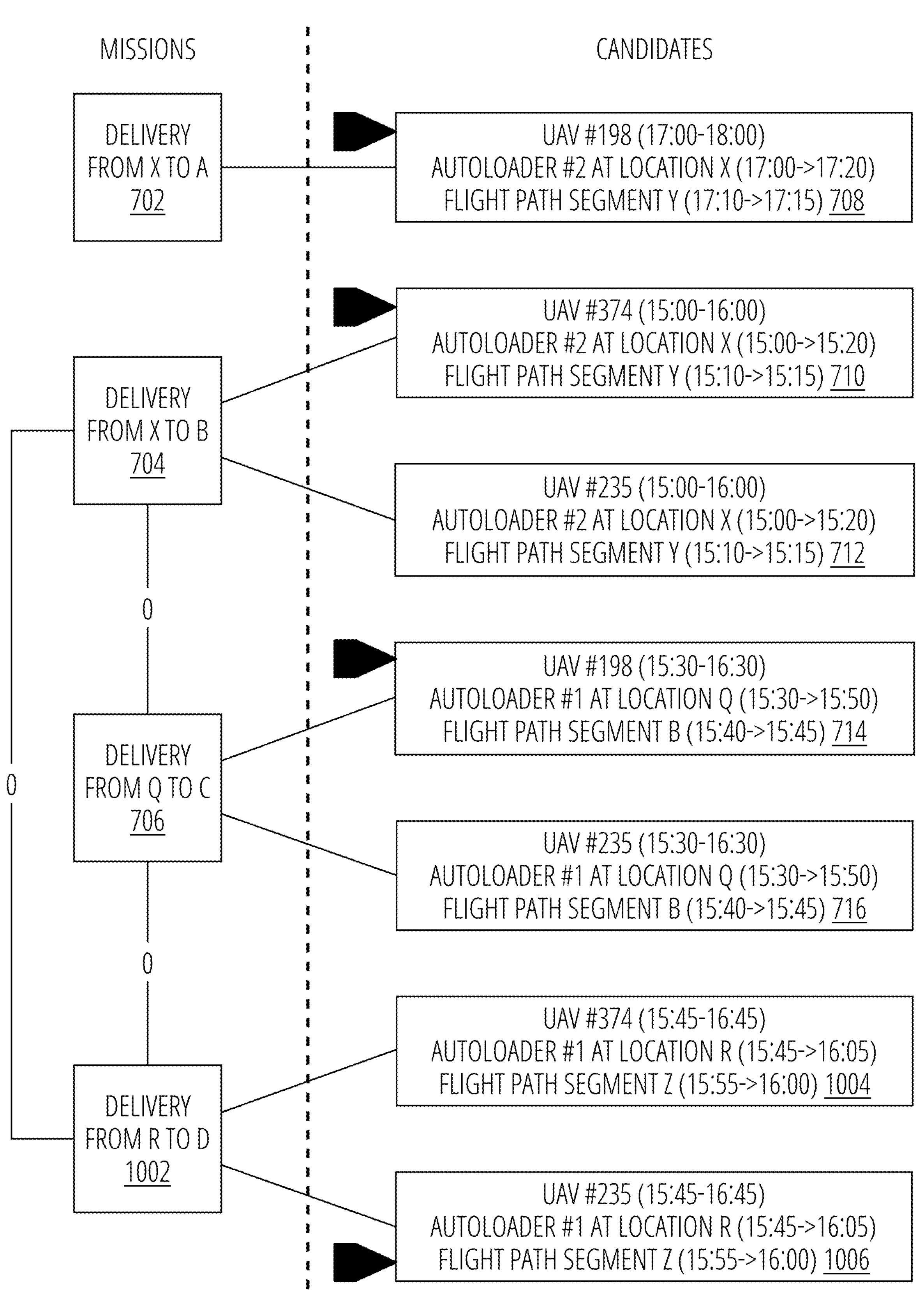

FIG. 12B illustrates the state of the RCN graph after removing candidate layer edges connected to neighboring candidate nodes of the committed candidate node from the RCN graph. This corresponds to the actions of block 1102. As shown, the neighboring candidate nodes of the second new candidate node 1006 are the third candidate node 712, the fifth candidate node 716, and first new candidate node 1004. Accordingly, in FIG. 12B, the candidate layer edges connected to these nodes have been removed. It should be noted that, in FIG. 12B, the conflict counters on the mission layer edges have been updated, and reflect that there are no longer any conflicts between the mission nodes. In some embodiments, the mission layer edges may be removed once the counters reach zero, but in the illustrated embodiment, the mission layer edges have been retained for now.

Figure 12C:
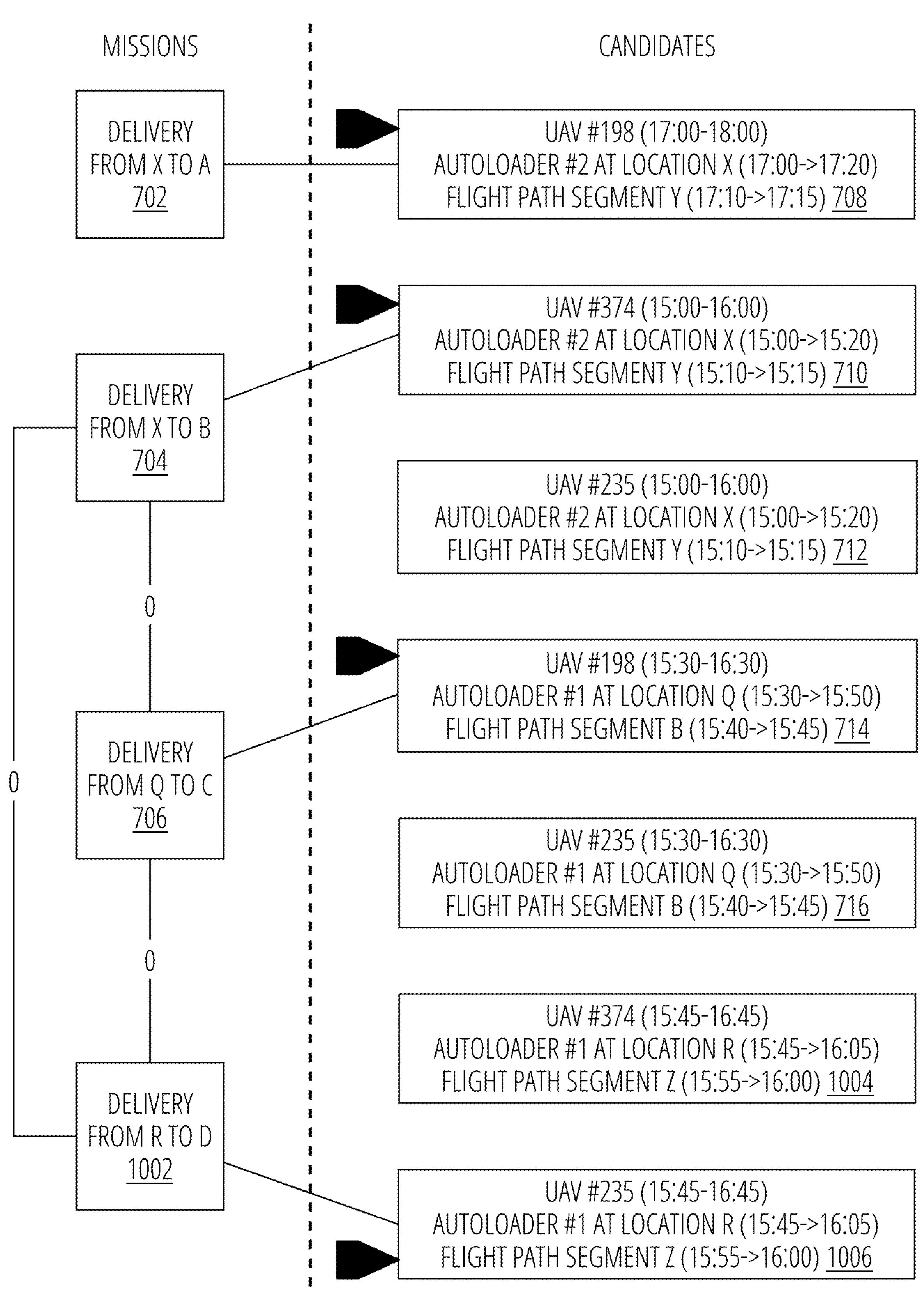

FIG. 12C illustrates the state of the RCN graph after removing the cross-layer edges connected to the neighboring candidate nodes of the committed candidate node from the RCN graph. This corresponds to the actions of block 1104.

Figure 12D:
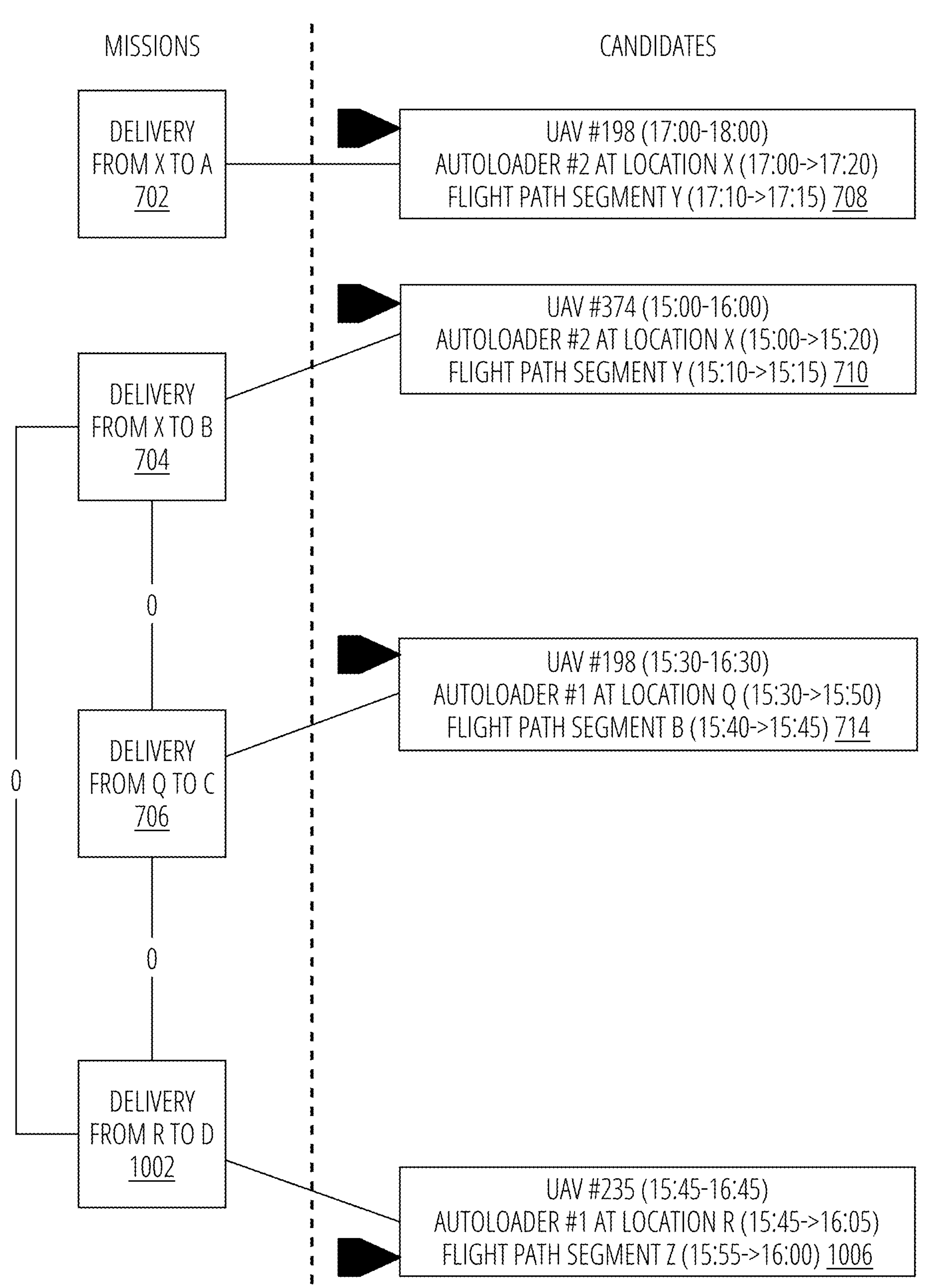

FIG. 12D illustrates the state of the RCN graph after removing the neighboring candidate nodes from the RCN graph. This corresponds to the actions of block 1106. As shown, the neighboring candidate nodes (third candidate node 712, fifth candidate node 716, and first new candidate node 1004) are now removed.

Figure 12E:
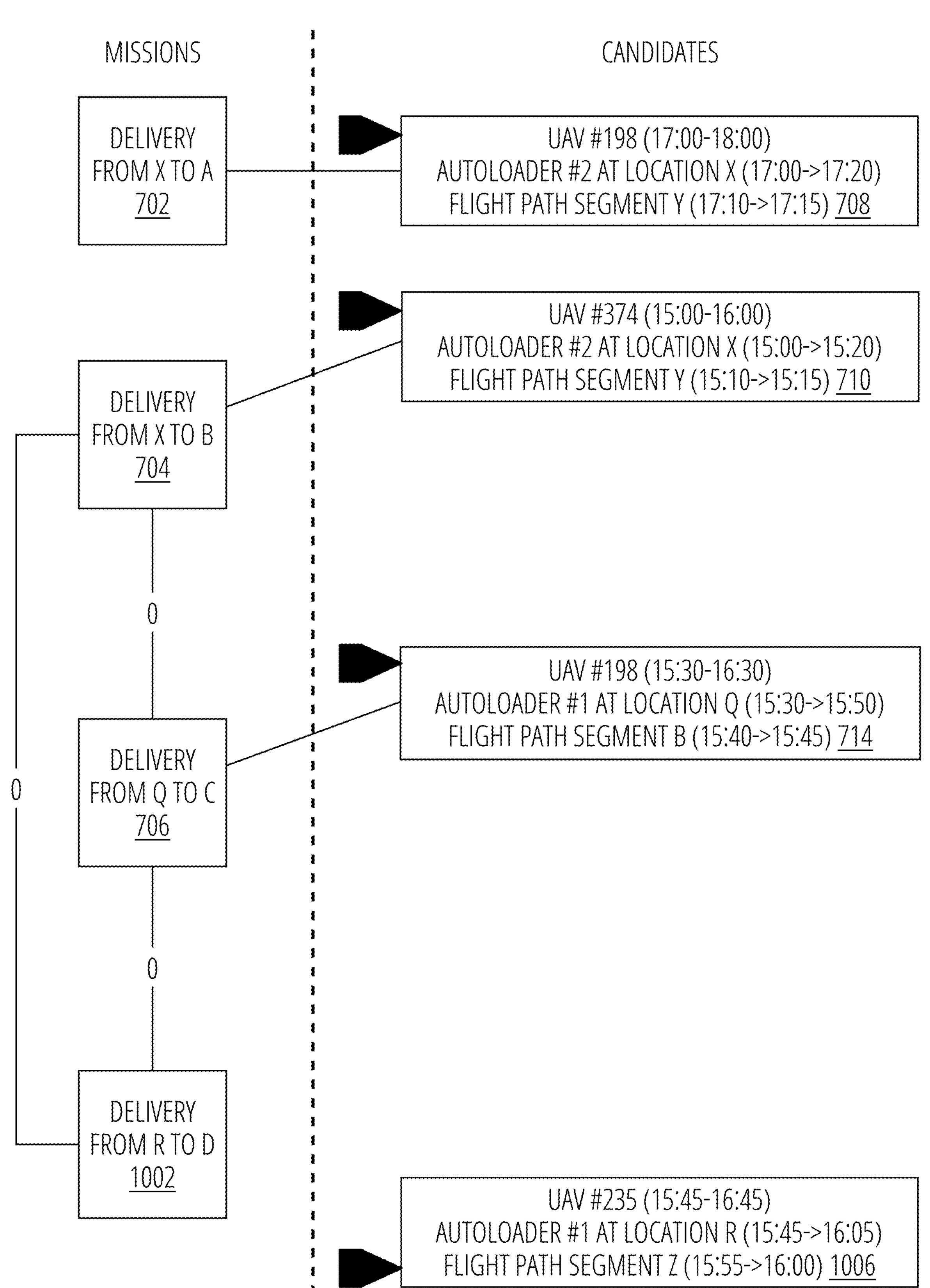
Figure 12F:
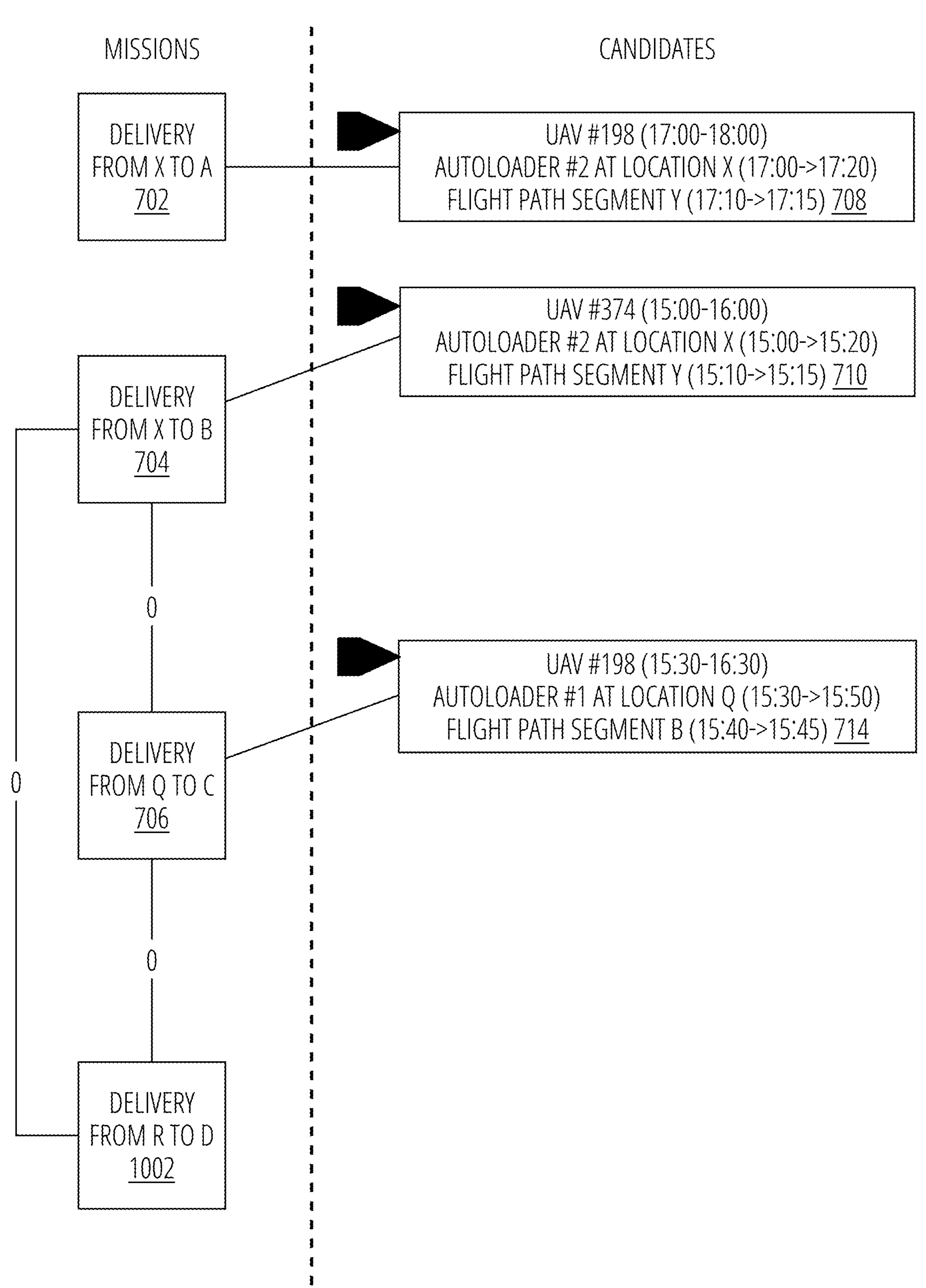

FIG. 12E illustrates the state of the RCN graph after removing the edges connected to the committed candidate node from the RCN graph. This corresponds to the actions of block 1108. As shown, the second new candidate node 1006 is now not connected to any other node in the RCN graph. FIG. 12F illustrates the state of the RCN graph after removing the committed candidate node from the RCN graph. This corresponds to the actions of block 1110.

Figure 12G:
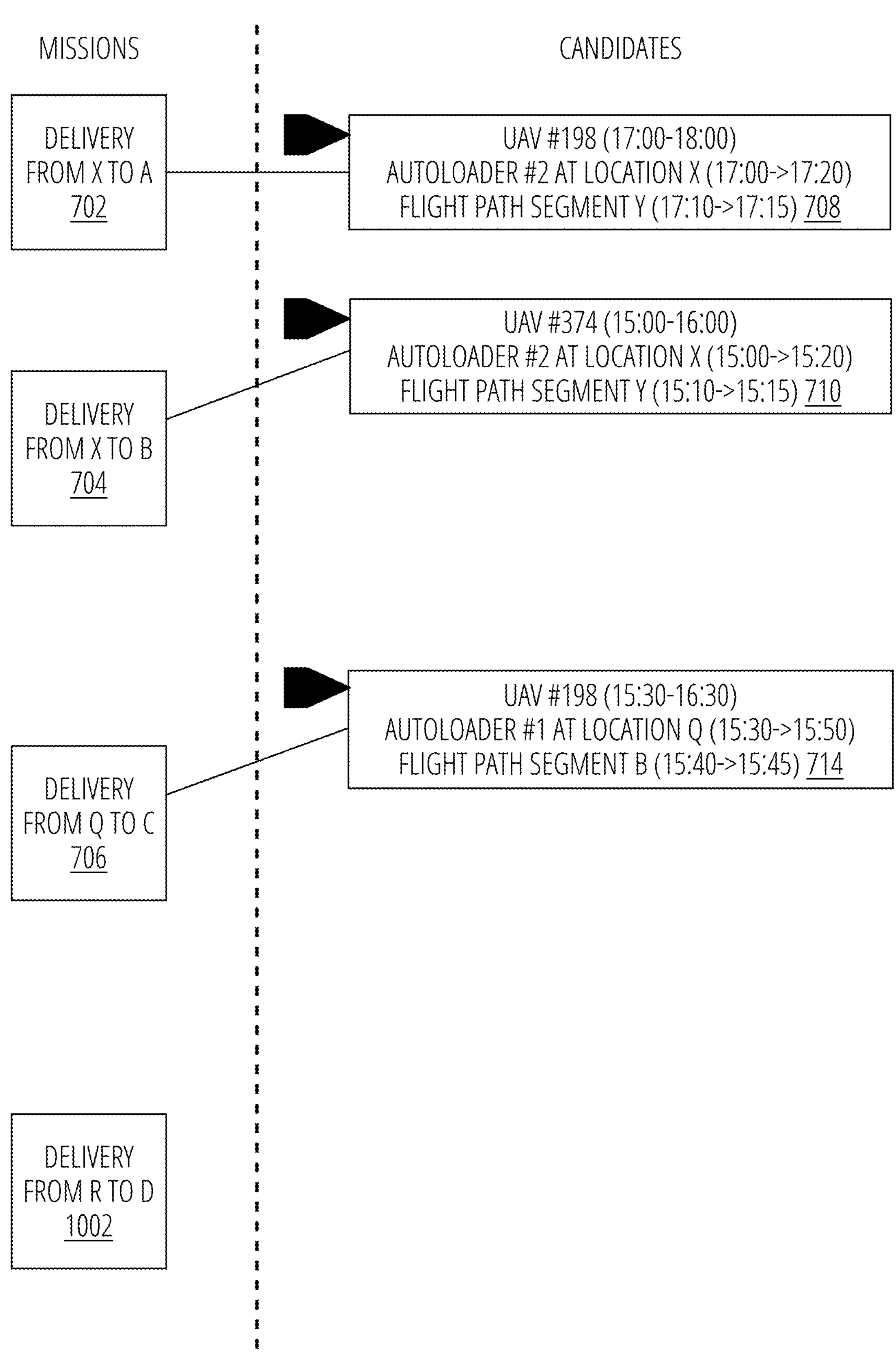
Figure 12H:
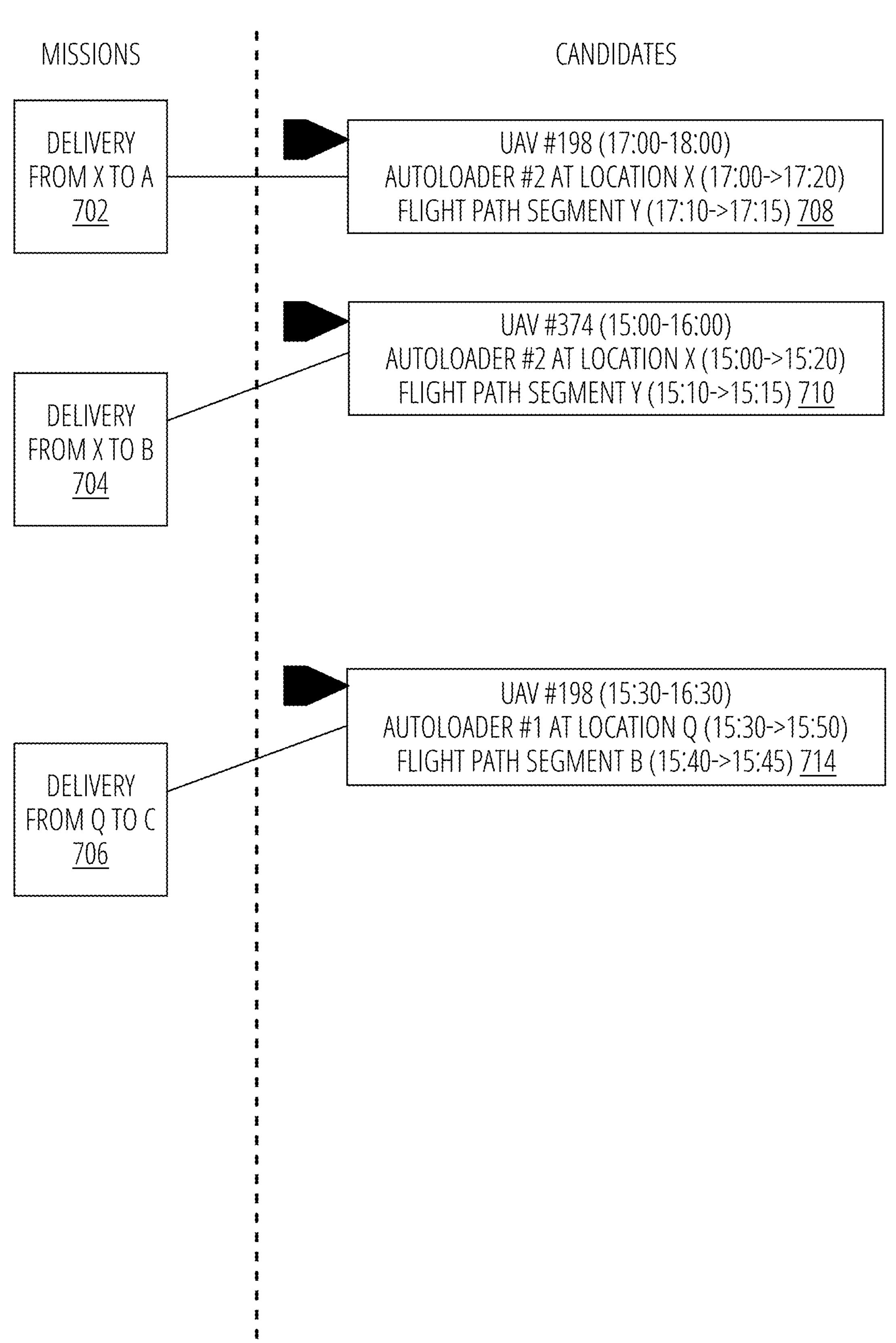

Once the actions for maintaining the candidate layer have been completed, the mission layer may be maintained. Accordingly, FIG. 12G shows the state of the RCN graph after removing edges connected to the mission node from the RCN graph. This corresponds to the actions of block 1112. As shown, the new mission node 1002 is no longer connected to any other components of the RCN graph. Finally, FIG. 12H shows the state of the RCN graph after removing the new mission node 1002, corresponding to the actions of block 1114.

In the preceding description, numerous specific details are set forth to provide a thorough understanding of various embodiments of the present disclosure. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The order in which some or all of the blocks appear in each method flowchart should not be deemed limiting. Rather, one of ordinary skill in the art having the benefit of the present disclosure will understand that actions associated with some of the blocks may be executed in a variety of orders not illustrated, or even in parallel.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A non-transitory computer-readable medium having logic stored thereon that, in response to execution by one or more processors of a computing system, cause the computing system to perform actions for managing resources of a fleet of unmanned aerial vehicles (UAVs), the actions comprising:

creating, by the computing system, a mission record and one or more candidate records, wherein each candidate record of the one or more candidate records represents one or more resources for accomplishing a mission represented by the mission record;

adding, by the computing system, a mission node representing the mission record to a resource competition network graph (RCN graph);

adding, by the computing system, one or more candidate nodes representing the one or more candidate records to the RCN graph;

determining, by the computing system, an optimized allocation of candidate records to mission records using at least a subgraph of the RCN graph;

determining a candidate record to commit to a mission record;

updating, by the computing system, the RCN graph to commit the candidate record to the mission record; and transmitting, by the computing system, commands to one or more resources of the candidate record committed to the mission record to execute the mission represented by the mission record;

wherein the RCN graph includes:

a mission layer;

a candidate layer;

one or more candidate layer edges that connect candidate nodes in the candidate layer to indicate that the connected candidate nodes conflict with each other;

one or more cross-layer edges that connect candidate nodes in the candidate layer and mission nodes in the mission layer; and one or more mission layer edges that connect mission nodes in the mission layer to indicate that the mission nodes are connected to conflicting candidate nodes.

2. The non-transitory computer-readable medium of claim 1, wherein adding the one or more candidate nodes representing the one or more candidate records to the RCN graph includes:

determining, by the computing system, a set of potentially conflicting candidate nodes in the RCN graph for a new candidate node using a geospatial lookup table; and for each potentially conflicting candidate node having a conflict with the new candidate node, creating a candidate layer edge in the RCN graph connecting the potentially conflicting candidate node having the conflict with the new candidate node.

3. The non-transitory computer-readable medium of claim 2, wherein adding the one or more candidate nodes representing the one or more candidate records to the RCN graph further includes:

for each potentially conflicting candidate node having a conflict with the new candidate node, creating a mission layer edge between the mission node and a conflicting mission node associated with the potentially conflicting candidate node having the conflict.

4. The non-transitory computer-readable medium of claim 1, wherein updating the RCN graph to commit the candidate record to the mission record includes operations comprising:

removing a candidate node representing the candidate record;

removing neighboring candidate nodes connected to the candidate node;

removing edges connected to any of the candidate node or the neighboring candidate nodes;

removing a mission node representing the mission record; and removing edges connected to the mission node.

5. The non-transitory computer-readable medium of claim 4, wherein the operations of updating the RCN graph to commit the candidate record to the mission record are rolled back if not all constituent mutation operations succeed.

6. The non-transitory computer-readable medium of claim 1, wherein determining the optimized allocation of candidate records to mission records using at least a subgraph of the RCN graph includes:

determining a mutated subgraph of the RCN graph since a previous optimized allocation of candidate records; and conducting an optimization over the mutated subgraph to allocate candidate records to the mission records.

7. The non-transitory computer-readable medium of claim 6, wherein conducting the optimization includes using at least one of an integer programming solver, an exhaustive search allocation, a random priority candidate allocation, an auction optimization, a stochastic optimization, a belief propagation allocation, or a population technique.

8. The non-transitory computer-readable medium of claim 1, wherein determining the candidate record to commit to the mission record includes receiving a command to commit the candidate record to the mission record from a mission planning and assignment system.

9. The non-transitory computer-readable medium of claim 1, wherein the actions further comprise:

creating, by the computing system, a batch associated with a predetermined batch time span and a given geographical area associated with a first mutation applied to the RCN graph in volatile memory;

collecting, by the computing system, additional mutations applied to the RCN graph during the predetermined batch time span and associated with mission nodes or candidate nodes within the given geographical area;

upon the expiration of the predetermined batch time span, applying the mutations in the batch to the RCN graph in non-volatile memory; and rolling back any applied mutations from the batch if any of the mutations in the batch are not successfully applied.

10. A computer-implemented method for managing resources of a fleet of unmanned aerial vehicles (UAVs), the method comprising:

creating, by a computing system, a mission record and one or more candidate records, wherein each candidate record of the one or more candidate records represents one or more resources for accomplishing a mission represented by the mission record;

adding, by the computing system, a mission node representing the mission record to a resource competition network graph (RCN graph);

adding, by the computing system, one or more candidate nodes representing the one or more candidate records to the RCN graph;

determining, by the computing system, an optimized allocation of candidate records to mission records using at least a subgraph of the RCN graph;

determining a candidate record to commit to a mission record;

updating, by the computing system, the RCN graph to commit the candidate record to the mission record; and transmitting, by the computing system, commands to one or more resources of the candidate record committed to the mission record to execute the mission represented by the mission record;

wherein the RCN graph includes:

a mission layer;

a candidate layer;

one or more candidate layer edges that connect candidate nodes in the candidate layer to indicate that the connected candidate nodes conflict with each other;

one or more cross-layer edges that connect candidate nodes in the candidate layer and mission nodes in the mission layer; and one or more mission layer edges that connect mission nodes in the mission layer to indicate that the mission nodes are connected to conflicting candidate nodes.

11. The computer-implemented method of claim 10, wherein adding the one or more candidate nodes representing the one or more candidate records to the RCN graph includes:

determining, by the computing system, a set of potentially conflicting candidate nodes in the RCN graph for a new candidate node using a geospatial lookup table; and for each potentially conflicting candidate node having a conflict with the new candidate node, creating a candidate layer edge in the RCN graph connecting the potentially conflicting candidate node having the conflict with the new candidate node.

12. The computer-implemented method of claim 11, wherein adding the one or more candidate nodes representing the one or more candidate records to the RCN graph further includes:

for each potentially conflicting candidate node having a conflict with the new candidate node, creating a mission layer edge between the mission node and a conflicting mission node associated with the potentially conflicting candidate node having the conflict.

13. The computer-implemented method of claim 10, wherein updating the RCN graph to commit the candidate record to the mission record includes operations comprising:

removing a candidate node representing the candidate record;

removing neighboring candidate nodes connected to the candidate node;

removing edges connected to any of the candidate node or the neighboring candidate nodes;

removing a mission node representing the mission record; and removing edges connected to the mission node.

14. The computer-implemented method of claim 13, wherein the operations of updating the RCN graph to commit the candidate record to the mission record are rolled back if not all constituent mutation operations succeed.

15. The computer-implemented method of claim 10, wherein determining the optimized allocation of candidate records to mission records using at least a subgraph of the RCN graph includes:

determining a mutated subgraph of the RCN graph since a previous optimized allocation of candidate records; and conducting an optimization over the mutated subgraph to allocate candidate records to the mission records.

16. The computer-implemented method of claim 15, wherein conducting the optimization includes using at least one of an integer programming solver, an exhaustive search allocation, a random priority candidate allocation, an auction optimization, a stochastic optimization, a belief propagation allocation, or a population technique.

17. The computer-implemented method of claim 10, wherein determining the candidate record to commit to the mission record includes receiving a command to commit the candidate record to the mission record from a mission planning and assignment system.

18. The computer-implemented method of claim 10, further comprising:

creating, by the computing system, a batch associated with a predetermined batch time span and a given geographical area associated with a first mutation applied to the RCN graph in volatile memory;

collecting, by the computing system, additional mutations applied to the RCN graph during the predetermined batch time span and associated with mission nodes or candidate nodes within the given geographical area;

upon the expiration of the predetermined batch time span, applying the mutations in the batch to the RCN graph in non-volatile memory; and rolling back any applied mutations from the batch if any of the mutations in the batch are not successfully applied.

* * * * *